(12) United States Patent
Lu et al.

(10) Patent No.: US 11,783,243 B2
(45) Date of Patent: Oct. 10, 2023

(54) TARGETED PRIORITIZATION WITHIN A NETWORK BASED ON USER-DEFINED FACTORS AND SUCCESS RATES

(71) Applicant: International Business Machines Corporation, Armonk, NY (US)

(72) Inventors: Cindy Han Lu, San Jose, CA (US); Ishita Mandhan, Campbell, CA (US); Thai Quoc Tran, San Jose, CA (US); Paul Van Eck, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1270 days.

(21) Appl. No.: 15/709,495

(22) Filed: Sep. 20, 2017

(65) Prior Publication Data
US 2019/0087767 A1    Mar. 21, 2019

(51) Int. Cl.
*G06Q 10/0631* (2023.01)
*G06F 21/62* (2013.01)
*G06Q 10/06* (2023.01)
*G06F 16/2457* (2019.01)

(52) U.S. Cl.
CPC . *G06Q 10/063112* (2013.01); *G06F 21/6218* (2013.01); *G06F 16/24578* (2019.01); *G06F 2221/2111* (2013.01); *G06Q 10/06* (2013.01)

(58) Field of Classification Search
CPC ............ G06Q 10/063112; G06Q 10/06; G06F 21/6218; G06F 16/24578; G06F 2221/2111; H04W 28/08
See application file for complete search history.

(56) References Cited

U.S. PATENT DOCUMENTS

| 9,264,329 | B2 | 2/2016 | Chrapko et al. |
| 9,299,115 | B2 | 3/2016 | Mahmud et al. |
| 9,519,682 | B1 | 12/2016 | Pujara et al. |
| 9,715,496 | B1 * | 7/2017 | Sapoznik ............ G06F 16/3344 |
| 9,911,412 | B2 * | 3/2018 | Labsky .................. G06F 40/35 |
| 2003/0125965 | A1 * | 7/2003 | Falso ..................... G06Q 40/08 705/317 |

(Continued)

OTHER PUBLICATIONS

Chris Biemann, "Chinese Whispers—an Efficient Graph Clustering Algorithm and its Application to Natural Language Processing Problems," 2006, pp. 73-80. (Year: 2006).*

(Continued)

*Primary Examiner* — Jahangir Kabir
*Assistant Examiner* — Canh Le
(74) *Attorney, Agent, or Firm* — Maever Carpenter; George S. Blasiak; Heslin Rothenberg Farley & Mesiti P.C.

(57) ABSTRACT

Methods, computer program products, and systems are presented. The method computer program products, and systems can include, for instance: establishing a relationship graph for a certain user, the relationship graph having a primary node that specifies the certain user and a plurality of lower order nodes, wherein the primary node and at least one lower order node of the plurality of lower order nodes is connected to at least one other node by an edge so that there are defined a plurality of edges; generating a prioritized list of individuals to provide assistance to the certain user in respect to the certain task based on populated edge weight scores for edges of the relationship graph; and providing one or more output based on the prioritized list.

20 Claims, 10 Drawing Sheets

(56) References Cited

U.S. PATENT DOCUMENTS

| | | | |
|---|---|---|---|
| 2005/0105712 A1* | 5/2005 | Williams | H04M 3/5166 |
| | | | 379/265.02 |
| 2008/0319664 A1* | 12/2008 | Kremin | G01C 21/005 |
| | | | 701/469 |
| 2011/0260860 A1 | 10/2011 | Gupta | |
| 2014/0120515 A1 | 5/2014 | Mahmud et al. | |
| 2014/0173555 A1* | 6/2014 | Ng | G06F 8/34 |
| | | | 717/109 |
| 2014/0317698 A1 | 10/2014 | Zafiroglu et al. | |
| 2015/0095078 A1* | 4/2015 | Braham | G06Q 10/0631 |
| | | | 705/7.14 |
| 2015/0120287 A1* | 4/2015 | Stern | G10L 15/183 |
| | | | 704/231 |
| 2015/0254371 A1* | 9/2015 | Zhang | G06F 16/9024 |
| | | | 707/798 |
| 2015/0262111 A1 | 9/2015 | Yu et al. | |
| 2015/0278960 A1* | 10/2015 | Moore | G06F 3/0482 |
| | | | 705/319 |
| 2016/0196313 A1* | 7/2016 | Allen | G06F 16/3329 |
| | | | 707/723 |
| 2016/0335600 A1* | 11/2016 | Jain | G06Q 10/1053 |
| 2017/0052761 A1* | 2/2017 | Gunshor | G06Q 50/01 |
| 2017/0131716 A1* | 5/2017 | Brekke | G05D 1/0088 |
| 2017/0250942 A1* | 8/2017 | Svendsen | H04L 51/10 |
| 2017/0269798 A1* | 9/2017 | Meyerzon | G06F 16/211 |
| 2017/0270480 A1* | 9/2017 | Woulfe | G06Q 10/101 |
| 2017/0286565 A1* | 10/2017 | Brave | G06Q 10/00 |
| 2017/0364156 A1* | 12/2017 | Kim | G06F 3/016 |
| 2018/0043229 A1* | 2/2018 | Stemle | G06T 7/11 |
| 2018/0075397 A1* | 3/2018 | Ronen | G06Q 10/067 |
| 2018/0101800 A1* | 4/2018 | Lecue | G06F 17/2705 |
| 2018/0144139 A1* | 5/2018 | Cheng | G06F 21/577 |
| 2018/0191962 A1* | 7/2018 | Javier | H04N 5/2621 |
| 2018/0232659 A1* | 8/2018 | Ranatunga | G06Q 30/0201 |
| 2018/0242254 A1* | 8/2018 | Bostick | H04W 52/0251 |
| 2018/0322462 A1* | 11/2018 | Jayaraman | G06N 20/00 |
| 2018/0357609 A1* | 12/2018 | Hwacinski | G06Q 10/1093 |
| 2019/0059337 A1* | 2/2019 | Robbins | A61B 5/0008 |
| 2019/0073637 A1* | 3/2019 | Madhey | G06Q 10/06 |
| 2019/0087767 A1* | 3/2019 | Lu | G06F 21/6218 |

OTHER PUBLICATIONS

Rongjing Xiang et al., "Modeling Relationship Strength in Online Social Networks," 2010, pp. 981-990. (Year: 2010).*

Global Dossier Report to U.S. Appl. No. 15/709,495; dated Jul. 18, 2023; 1 page.

* cited by examiner

TARGETED PRIORITIZATION WITHIN A NETWORK BASED ON USER-DEFINED FACTORS AND SUCCESS RATES

BACKGROUND

The present disclosure relates to artificial intelligence and computer machine learning and particularly to a computer implemented system for facilitating task performance and augmented communication between computer device users.

Data structures have been employed for improving operation of computer system. A data structure refers to an organization of data in a computer environment for improved computer system operation. Data structure types include containers, lists, stacks, queues, and graphs. Data structures have been employed for improved computer system operation e.g. in terms of algorithm efficiency, memory usage efficiency, maintainability, and reliability.

SUMMARY

Shortcomings of the prior art are overcome, and additional advantages are provided, through the provision, in one aspect, of a method. The method can include, for example: establishing a relationship graph for a certain user, the relationship graph having a primary node that specifies the certain user and a plurality of lower order nodes, wherein the primary node and at least one lower order node of the plurality of lower order nodes is connected to at least one other node by an edge so that there are defined a plurality of edges, wherein one or more lower order node of the plurality of lower order nodes specifies an individual socially connected to the certain user; wherein the establishing includes populating for edges of the plurality of edges an edge weight score indicating an ability of an individual specified in a lower order node to provide assistance to the certain user in respect to a certain task; generating a prioritized list of individuals to provide assistance to the certain user in respect to the certain task based on the populated edge weight scores for the edges; and providing one or more output based on the prioritized list.

In another aspect, a computer program product can be provided. The computer program product can include a computer readable storage medium readable by one or more processing circuit and storing instructions for execution by one or more processor for performing a method. The method can include, for example: establishing a relationship graph for a certain user, the relationship graph having a primary node that specifies the certain user and a plurality of lower order nodes, wherein the primary node and at least one lower order node of the plurality of lower order nodes is connected to at least one other node by an edge so that there are defined a plurality of edges, wherein one or more lower order node of the plurality of lower order nodes specifies an individual socially connected to the certain user; wherein the establishing includes populating for edges of the plurality of edges an edge weight score indicating an ability of an individual specified in a lower order node to provide assistance to the certain user in respect to a certain task; generating a prioritized list of individuals to provide assistance to the certain user in respect to the certain task based on the populated edge weight scores for the edges; and providing one or more output based on the prioritized list.

In a further aspect, a system can be provided. The system can include, for example a memory. In addition, the system can include one or more processor in communication with the memory. Further, the system can include program instructions executable by the one or more processor via the memory to perform a method. The method can include, for example: establishing a relationship graph for a certain user, the relationship graph having a primary node that specifies the certain user and a plurality of lower order nodes, wherein the primary node and at least one lower order node of the plurality of lower order nodes is connected to at least one other node by an edge so that there are defined a plurality of edges, wherein one or more lower order node of the plurality of lower order nodes specifies an individual socially connected to the certain user; wherein the establishing includes populating for edges of the plurality of edges an edge weight score indicating an ability of an individual specified in a lower order node to provide assistance to the certain user in respect to a certain task; generating a prioritized list of individuals to provide assistance to the certain user in respect to the certain task based on the populated edge weight scores for the edges; and providing one or more output based on the prioritized list.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
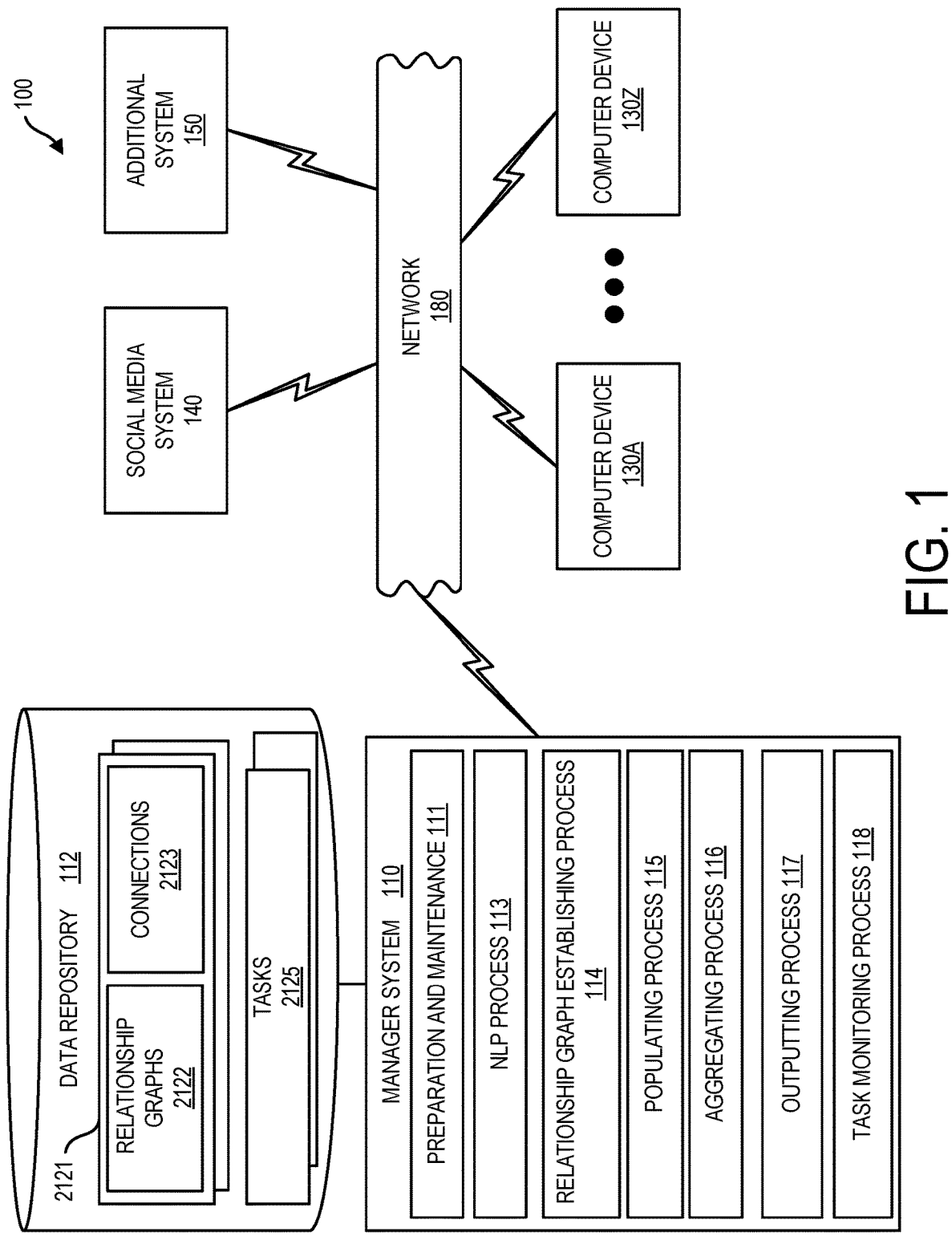
FIG. 1 depicts a system having manager system, computer devices, and a social media system in one embodiment.

FIG. 1 is a block diagram of system 100, in accordance with one embodiment as set forth herein. The embodiment of FIG. 1, system 100 can include numerous devices such as computer node based devices connected by a network 180. For example, network 180 may be a physical network or a virtual network. A physical network can be for example, a physical telecommunications network connecting numerous computer nodes or systems, such as computer servers and computer clients. By contrast, a virtual network can for example, combine numerous physical networks or parts thereof into a logical virtual network. In another example, numerous virtual networks can be defined over a single virtual network.

By way of explanation, FIG. 1 depicts an example environment. In one embodiment, system 100 can include a manager system 110, having an associated data repository 112, computer devices 130A-130Z, one or more social media system 140, and one or more additional system 150 connected via network 180. Computer devices 130A-130Z, can be computer devices used by users of system 100, such as users who use system 100 to obtain information on individuals who are capable of providing assistance with respect to defined tasks. Computer devices 130A-130Z can be provided e.g. by smartphones, laptops, smartwatches, and/or PCs. One or more additional system 150 can be provided by a newsfeed system in one embodiment.

Social media system 140 can include a collection of files, including for example, HTML files, CSS files, image files, and JavaScript files. Social media system 140 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC).

In one embodiment, manager system 110 can be external to and remote from each of computer devices 130A-130Z one or more social media system 140 and one or more additional system 150. In one embodiment manager system 110 can be co-located with at least one computer device of computer devices 130A-130Z, and/or one or more social media system 140, and/or one or more additional system 150.

Manager system 110 can run various processes such as preparation and maintenance process 111, natural language processing (NLP) process 113, relationship graph establishing process 114, relationship graph populating process 115, relationship graph aggregating process 116, outputting process 117, and task monitoring process 118.

Data repository 112 can store various data. In users area 2121, data repository 112 can store data for various users. For each of several users, data repository 112 can store in relationship graphs area 2122 relationship graphs for a particular user. Manager system 110 can define a new relationship graph for each new defined task and can iteratively update such relationship graph. In connections area 2123, data repository 112 can store data regarding connections of the user. Manager system 110 can use connections area 2123 in performing establishing and updating of new relationship graphs for a particular user or for several users. In tasks area 2125, data repository 112 can store data regarding tasks that have been performed under the guidance provided by system 100. Manager system 110 can run NLP process 113, for purposes of analyzing unstructured data and for structuring in such unstructured data. In one aspect, NLP process 113 can run the topic classifier process that determines the topic of an analyzed unstructured data record.

Manager system 110 can run NLP process 113 to process data for preparation of records that are stored in data repository 112 and for other purposes. Manager system 110 can run a Natural Language Processing (NLP) process 113 for determining one or more NLP output parameter of a message. Manager system 110 can tag a processed message with a metadata provided by one or more NLP output parameter. NLP process 113 can include one or more of a topic classification process that determines topics of messages and output one or more topic NLP output parameter, a sentiment analysis process which determines sentiment parameter for a message, e.g. polar sentiment NLP output parameters, "negative," "positive," and/or non-polar NLP output sentiment parameters, e.g. "anger," "disgust," "fear," "joy," and/or "sadness" or other classification process for output of one or more other NLP output parameters e.g. one of more "social tendency" NLP output parameter or one or more "writing style" NLP output parameter.

By running of NLP process 113 manager system 110 can perform a number of processes including one or more of (a) topic classification and output of one or more topic NLP output parameter for a received message (b) sentiment classification and output of one or more sentiment NLP output parameter for a received message or (c) other NLP classifications and output of one or more other NLP output parameter for the received message. Topic analysis for topic classification and output of NLP output parameter can include topic segmentation to identify several topics within a message. Topic analysis can apply a variety of technologies e.g. clustering one or more of hidden mark model (HMM), artificial chains, and passage similarities using word co-occurrence or topic modeling.

Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (that is to say, the emotional state of the author when writing), or the intended emotional communication (that is to say, the emotional effect the author wishes to have on the reader). In one embodiment sentiment analysis can classify the polarity of a given text at the document, sentence, or feature/aspect level—whether the expressed opinion in a document, a sentence or an entity feature/aspect is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness." In one embodiment, determining sentiment can include use of a scaling system whereby words commonly associated with having a negative, neutral or positive sentiment with them are given an associated number on a −10 to +10 scale (most negative up to most positive). Accordingly, it can be possible to adjust the sentiment of a given term relative to its environment (usually on the level of the sentence). When a piece of unstructured text is analyzed using natural language processing, each concept in the specified environment can be given a score based on the way sentiment words relate to the concept and its associated score. Accordingly, it can be possible to adjust the sentiment value of a concept relative to modifications that may surround it. Words, for example, that intensify, relax or negate the sentiment expressed by the concept can affect its score. Alternatively, text can be given a positive and negative sentiment strength score if the goal is to determine the sentiment in a text rather than the overall polarity and strength of the text. Performing sentiment analyses can include use of knowledge based techniques, statistical methods, and/or hybrid approaches.

Manager system 110 can run relationship graph establishing process 114 to establish a relationship graph. An established relationship graph can be characterized by a primary node and a plurality of lower order nodes. A primary node can specify a user and the lower order nodes can specify individuals who may provide assistance to the user specified in the primary node, in the performance of a defined task.

Edges between the nodes can include weights, wherein the weights specify an ability of an individual to provide assistance in regard to a task Running relationship graph establishing process 114 can include obtaining information on capacities of individuals to assist a user in the performance of a task. In one embodiment, running relationship graph establishing process 114 can include examining data based on rules defining information entered into a user interface form. Lower order nodes can include e.g. secondary nodes, tertiary nodes, and nodes of lower hierarchy than tertiary nodes. In some embodiments, the number of layers of hierarchy can be restricted absent e.g. to be of nodes of lower priority than a tertiary node, or a secondary node.

Manager system 110 can run populating process 118 as part of running relationship graph establishing process 114. Manager system 110 can run populating process 115 to populate edge weight scores of a relationship graph. In one embodiment, manager system 110 can use an aggregated relationship graph in the populating of a relationship graph for a certain user. Manager system 110 can aggregate relationship graphs to output an aggregated relationship graph.

Manager system 110 can run relationship graph aggregating process 116 as part of running relationship graph populating process. Manager system 110 can run relationship graph aggregating process 116 to aggregate relationship graphs of a plurality of user.

Manager system 110 can run outputting process 117 to provide one or more outputs for facilitating performance of a task. One or more output can include e.g. notifications for users regarding performing of a task. One or more output can include e.g. control communication outputs to activate task monitoring process 118.

Manager system 110 can run task monitoring process 118. Running task monitoring process 118 manager system 110 can ascertain the success or failure of a performed task.

Figure 2:
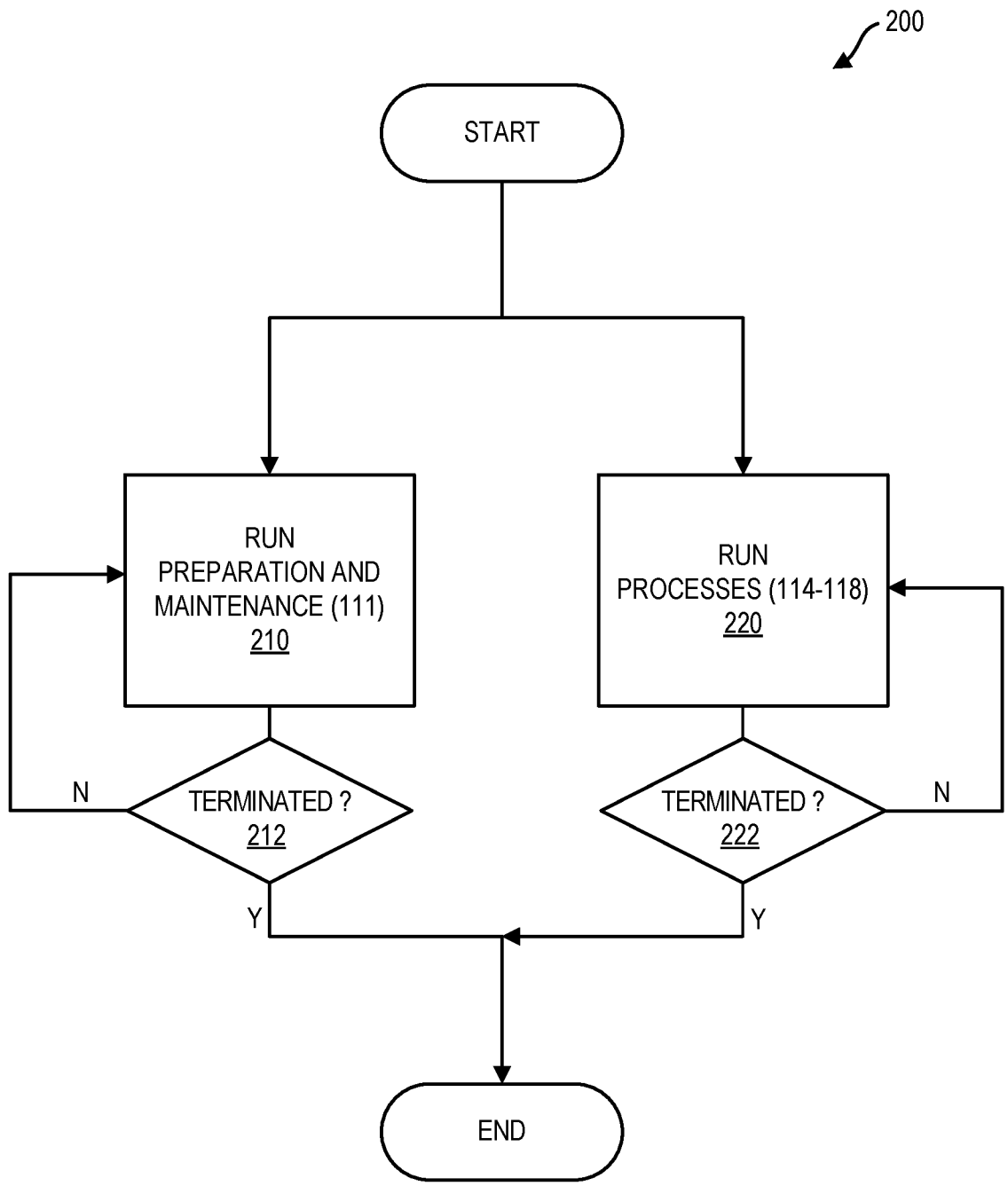
FIG. 2 is a flowchart depicting a method that can be performed by a manager system in one embodiment.

FIG. 2 is a flowchart illustrating a method 200 that can be performed by manager system 110. At block 210, manager system 110 can run preparation and maintenance process 111 e.g. to populate, prepare, and/or maintain various data of data repository 112 including data of relationship graphs area 2122, connections area 2123, and tasks area 2125. Manager system 110 can run preparation and maintenance process 111 until process 111 is terminated at block 212. At block 220, manager system 110 can run processes 114-118. A plurality of instances of processes 114-118 can be simultaneously run. Manager system 110 can run processes 114-118 iteratively until process 114-118 are is terminated at block 222.

For performance of preparation and maintenance process 111, manager system 110 can be configured to automatically process data inputs received from computer devices 130A-130Z, one or more social media system 140, and one or more additional system 150. For performance of preparation and maintenance process 111, manager system 110 can be configured to automatically receive data from computer devices 130A-130Z, from one or more social media system 140 and one or more additional system 150. Manager system 110 can run Natural Language Processing (NLP) process 113 for performing of preparation and maintenance process 111.

Figure 3:
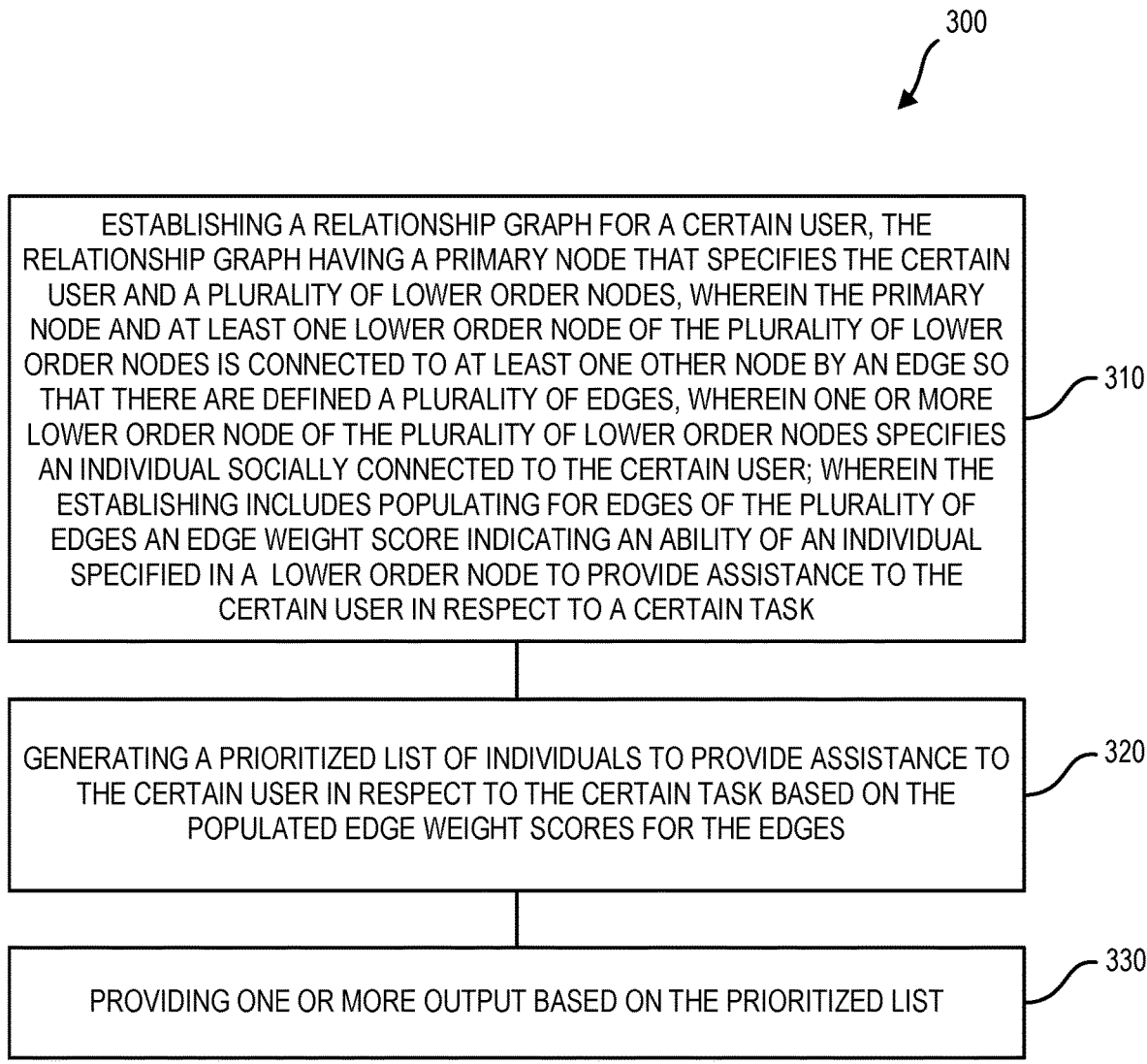
FIG. 3 is a flowchart depicting a method that can be performed by a manager system in one embodiment.

A method 300 that can be performed by manager system 110 in one embodiment is illustrated with respect to the flowchart of FIG. 3. At block 310, manager system 110 can perform establishing a relationship graph for a certain user, the relationship graph having a primary node that specifies the certain user and a plurality of lower order nodes, wherein the primary node and at least one lower order node of the plurality of lower order nodes is connected to at least one other node by an edge so that there are defined a plurality of edges, wherein one or more lower order node of the plurality of lower order nodes specifies an individual socially connected to the certain user; wherein the establishing includes populating for edges of the plurality of edges an edge weight score indicating an ability of an individual specified in a lower order node to provide assistance to the certain user in respect to a certain task. At block 320 manager system 110 can perform generating a prioritized list of individuals to provide assistance to the certain user in respect to the certain task based on the populated edge weight scores for the edges. At block 320 manager system 110 can perform providing one or more output based on the prioritized list.

Additional aspects of system 100 are described with reference to the flowchart of FIG. 4, which describes a particular embodiment of performance of method 300 by manager system 110 in the context of interoperation between manager system 110 and its associated data repository 112, between manager system 110 and computer devices 130A-130Z, and between manager system 110 and one or more social media system 140.

At block 1301, computer devices 130A-130Z can send data to manager system 110 for receipt by manager system 110 at block 1101. At block 1401, one or more social media system 140 can send data to manager system 110 for receipt by manager system 110 at block 1102. The data sent at blocks 1301 and 1401 can include various data e.g. at block 1301, can include data entered by various users into respective user interfaces for computer devices 130A-130, such as may be input via a user interface 700 as will be described herein in further detail in respect to FIG. 7, and data sent at block 1401 by one or more social media system 140 can include e.g. data on social connections of various users that have been entered into social media system 140.

During the course of use of one or more social media system 140, users can be continually updating their social contacts. There can be defined in one or more social media system 140 for a particular user, primary contacts who the user knows and secondary contacts e.g. users connected to the user's primary contacts.

At block 1302, a certain computer device e.g. computer device 130A, in response to an entered input by the user of that computer device, can send a request to manager system 110 for receipt by manager system 110 at block 1103. The request sent at block 1302 can be a request for assistance in respect to performance of a task. A task may be any task. Some limited examples can include e.g. a gardening task, an automotive repair task, a tax preparing desk a software training task or a driving lesson task. In response to receipt of request at block 1103, manager system 110 can proceed to block 1104 to perform relationship graph establishing. A task assistance request sent at block 1302 for receipt by manager system 110 at block 1103 can include at least a task description that can be classified as a task classification e.g. gardening task, an automotive repair task, a plumbing task, an electrician services task, and a carpentry task, a tax preparing task a software training task, a vehicle transportation task, or a driving lesson task. To initiate a task assistance request, a user can manually enter information specifying a task in area 704 of user interface 700 for display on a computer device. Manager system 110 can activate NLP process 113 to process input textual information to classify task describing information into a task classifier. For performance of task information obtaining at block 1104, manager system 110 can make multiple queries on data repository 112 indicated by query/response block 1121 for performance by data repository 112.

Figure 5:
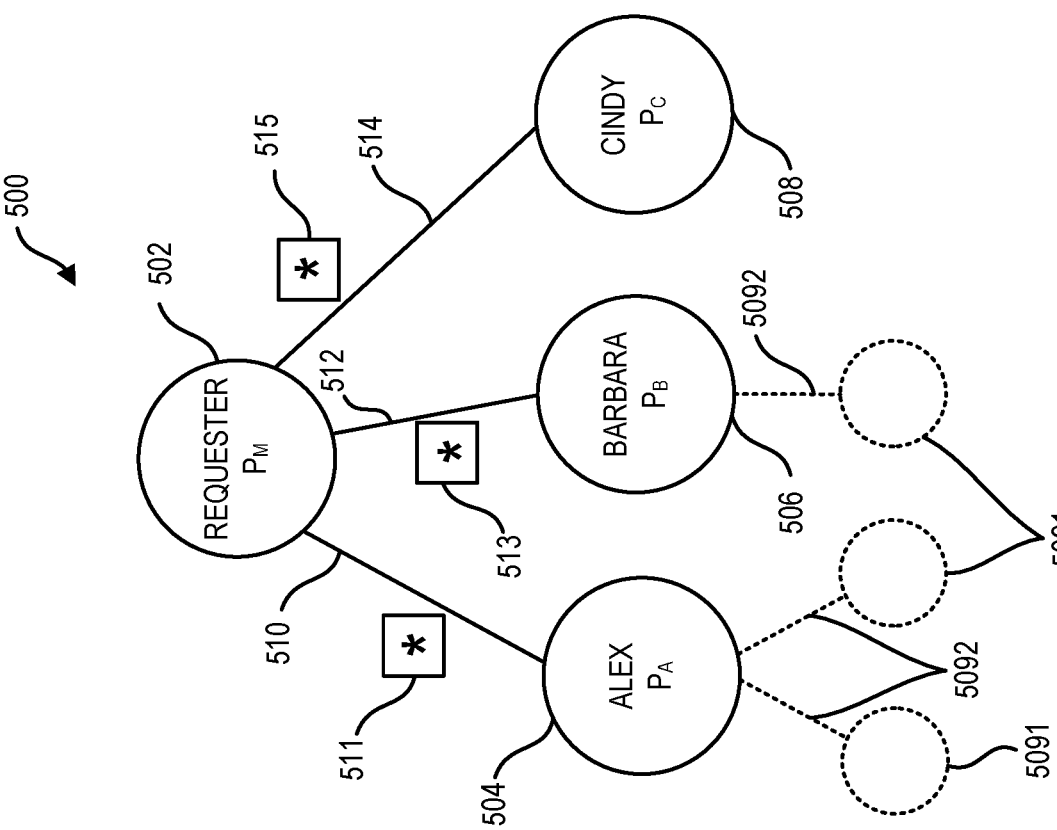

For performance of relationship graph establishing block 1104, manager system 110 can examine connections area 2123 to determine connections of the requesting user initiating the request sent at block 1302. For performance of establishing at block 1104 manager system 110 can use template graph 500. An example of template graph 500 is shown in FIG. 5. A template graph 500 which can be stored in data repository 112 can store the generic structure of a relationship graph 500i. Manager system 110 can use template graph 500 to determine an instance of a template graph 500 referred to herein as a relationship graph 500i. Referring to a structure of template graph 500 template graph 500 can have a primary node 502 specifying a user, and secondary nodes 504, 506, and 508 specifying individuals socially connected to the user specified in the primary node. Edges 510, 512, and 514 between primary node 502 and secondary nodes 504, 506, and 508 can have associated edge weights 511, 513, and 515. Scores for edge weights 511, 513, and 515 can be provided to indicate an ability of an individual to provide assistance to the certain user specified in the primary node regarding a specified task. Template graph 500 can have an associated variable task identifier that indicates the task being performed. Based on user configuration template graph 500 can include nodes of lower hierarchy than secondary nodes 504, 506, and 508. For example, based on configuration inputs entered by a user, template graph 500 can include tertiary nodes 5091 and edges 5092 connecting secondary nodes to tertiary nodes. Tertiary nodes 5091 can specify individuals socially connected to the certain user specified in the primary node e.g. tertiary nodes 5091 can specify individuals who are the primary contacts of individuals specified in secondary nodes 504i, 506i, and 508i. Based on user configuration, template graph 500 can have nodes of lower hierarchy than tertiary nodes 5091.

Figure 6:
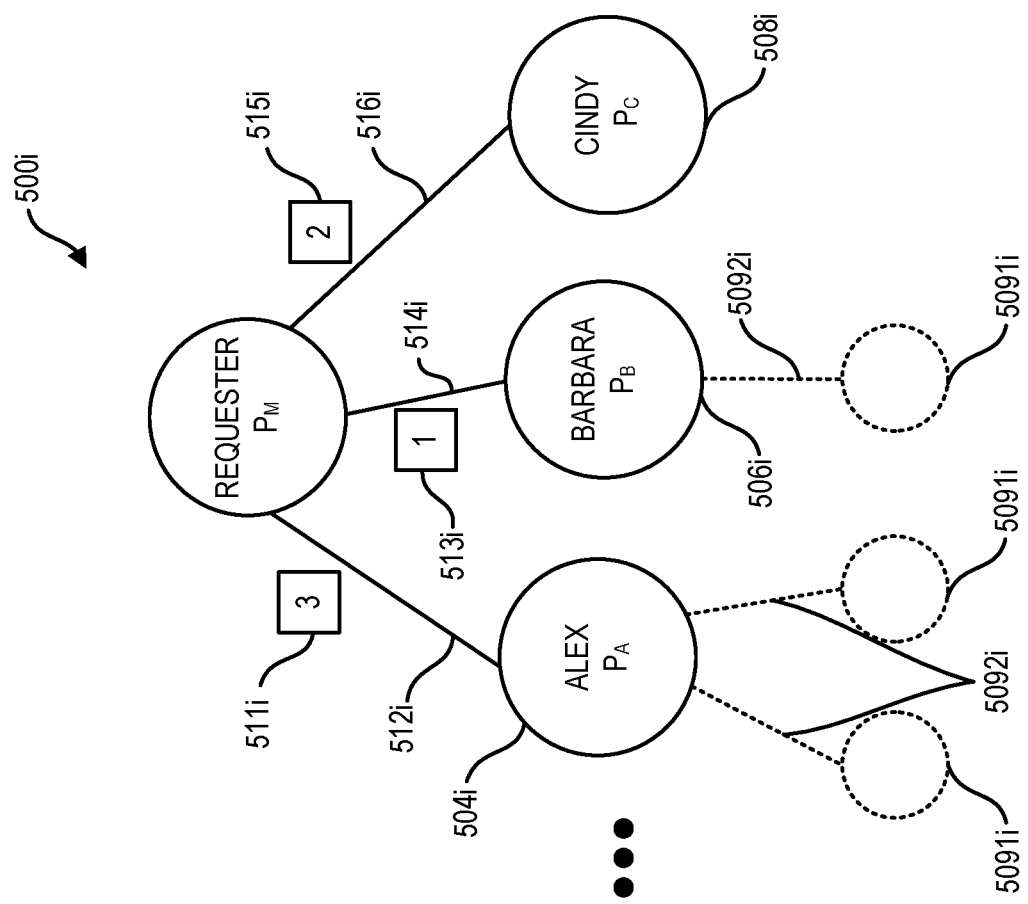
FIGS. 5-6 are depictions of relationship graphs according to one embodiment.

Referring to FIGS. 5 and 6, FIG. 6 illustrates an instance of template graph 500 to define a relationship graph 500i for a certain user. Where manager system 110 uses template graph 500 to define a relationship graph 500i at block 1105 manager system 110 can specify for primary node 502i an identifier of the requesting user initiating the assistance request at block 1302, and can specify for secondary nodes 504i, 506i, and 508i identifiers of individuals (e.g. primary contacts in one embodiment) socially connected to the user specified by primary node 502i. Manager system 110 can specify in tertiary nodes 5091i individuals who are socially connected to the certain user specified in primary node 502i, e.g. tertiary nodes 5091i can specify individuals who are the primary connections of individuals specified in or secondary nodes 504i, 506i, and/or 508i.

For populating edge weights 511i, 513i, and 515i for respective edges 512i, 514i, and 516i of relationship graph 500i manager system 110 can apply a function based on one or more factor. The one or more factor can be predetermined based on a configuration of system 100, user determined, or partially predetermined and user determined.

Figure 7:
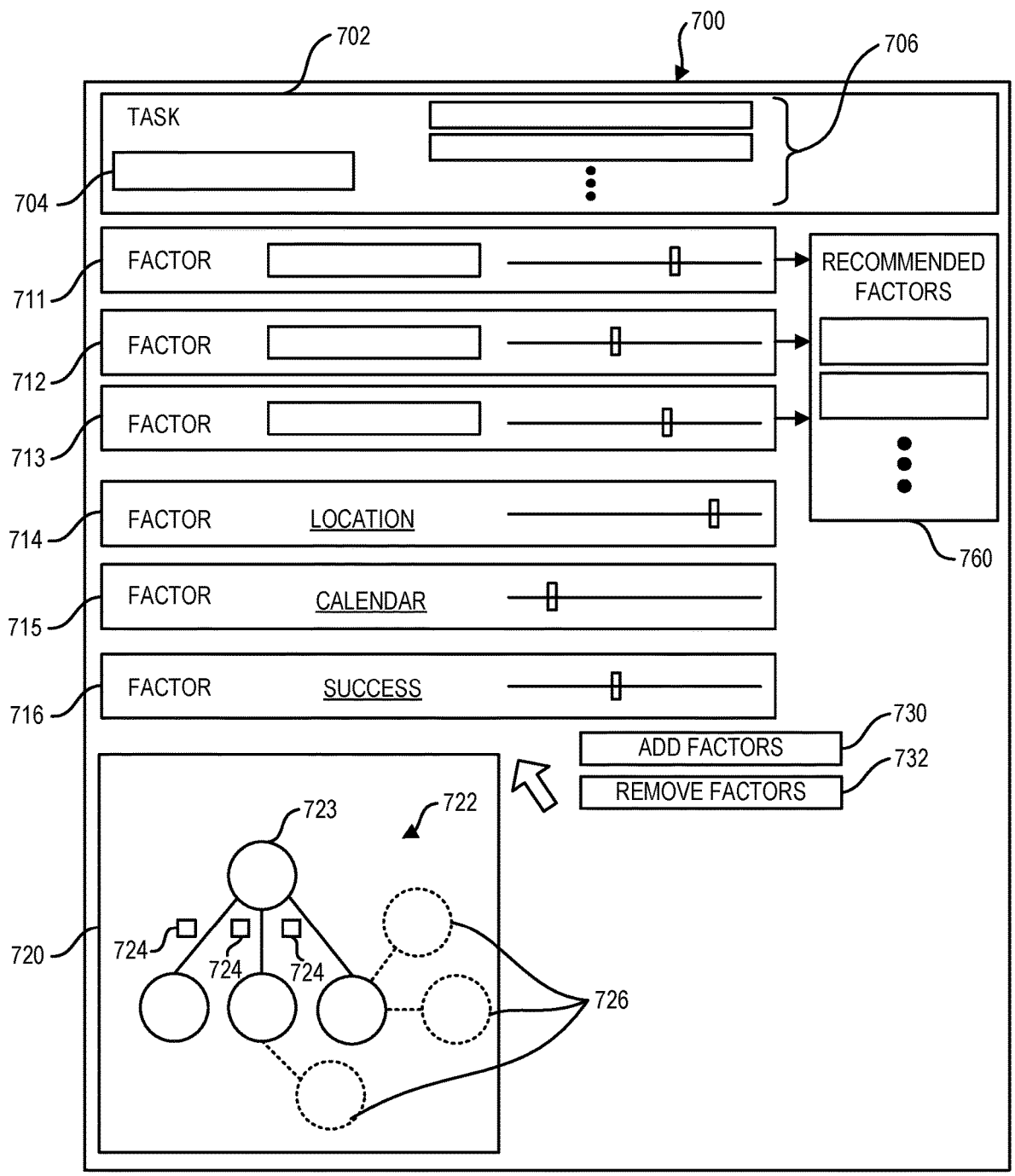
FIG. 7 illustrates a user interface for use in defining factors in one embodiment.

In one embodiment, users of system 100 can have access to a user interface 700 as shown in FIG. 7. User interface 700 can be a user interface for display on a display of a user computer devices 130A-130Z. User interface 700 allows a user to specify rules that facilitate manager system 110 determining edge weights of edges of a relationship graph such as relationship graph 500i. Referring to user interface 700, as shown in FIG. 7, area 704 allows the user to specify a task. Using area 704 a user can specify parameters of a task, e.g. a location of a task, materials for performance of a task, one or more characteristic of a successfully completed text, and/or completion time deadline. The task can be an arbitrary task for which the user may require assistance e.g. gardening task, an automotive repair task, a plumbing task, an electrician services task, and a carpentry task, a tax preparing task a software training, task, a vehicle transportation task, or a driving lesson task. In areas 711-713, user interface 700 allows a user to define arbitrary factors and areas 714-716 specify fixed system defined factors. The factors of areas 711-716 are factors that can be used by manager system 110 to determine a score value for an edge weight of an edge connecting a primary node to a lower order node, such as in relationship graph 500i as shown in FIG. 6. A determined edge weight can indicate an ability of an individual specified in a lower order node, e.g. a secondary node to provide assistance to a user specified in a primary node in the performance of a defined task. For determining of an edge weight score that indicates an ability of an individual to assist a user, manager system 110 can apply the function as set forth in equation one herein below.

$$S = F_1 W_1 + F_2 W_2 + F_3 W_3 + F_4 W_4 + F_5 W_5 + F_6 W_6 \qquad \text{(Eq. 1)}$$

Where S is the resulting edge weight based on multiple factors indicative of an ability of an individual to provide assistance, where $F_1$-$F_3$ are variable user defined factors specified in areas 711-713 in user interface 700, $F_4$-$F_6$ are fixed factors, specified in areas 714-716, applied by manager system 110, and where $W_1$-$W_6$ are weights associated with the various factors $F_1$-$F_6$. For each factor, a factor edge weight score can be provided that is indicative of an ability of an individual to provide assistance according to that factor. Using the slide selection function depicted in areas 711-716 the user can define the weights associated with each factor $F_1$-$F_6$. A greater number or lesser number of user defined factors can be defined. Also, a greater number or lesser number of system defined fixed factors can be defined. In one embodiment, an administrator user interface (not shown) can be provided that allows an administrator user to define zero or more system factors which are represented in user interface 700 as factor areas 714-716.

An example of a user defined factor can include e.g. a "relationship" factor, e.g. highest score according to a "relationship" factor can be provided where an individual is a relative, a middle range score can be provided where an individual is a "friend", a lowest score can be provided where the individual is an "acquaintance."

Another example of a user defined factor is a "node hierarchy" factor. In one embodiment, manager system 110 can limit candidate assistance providing individuals to first order contacts of a user. In another embodiment, manager system 110 may restrict candidate users to Nth order contacts, wherein N>1. In such an embodiment, a "node hierarchy" factor can result in allocating higher edge weight scores for higher order contacts and lower edge weight scores for lower order contacts.

Another example of user defined factor(s) is the factor "equipment availability" factor. An individual can be allocated a higher edge weight score under the equipment availability factor if the individual has his/her own equipment for performance of the task and a lower edge weight score where the user would need to provide the equipment.

Another example of a user defined factor is an "education" factor. Individuals can be allocated higher edge weight value scores under this factor based on educational attainment e.g. a highest edge weight score for graduate school or more, a medium edge weight score for some college, and a lowest edge weight score for no college.

Another factor can be a "professional standing" factor. Some tasks can be of a type commonly performed by persons having professional standing e.g. plumbing, carpentry, or electrician services. A highest edge weight score can be allocated to professionals under this factor, a medium edge weight score to apprentices, and a lowest edge weight score to amateurs.

Embodiments herein recognize that different users may have different preferences for selection of task assisting individual.

Examples of system applied fixed factors can be e.g. a location of the individual, the calendar availability of the individual, and the success of the individual in the performance of a prior tasks in common with the current task for which a relationship graph is being determined. The success factor can be specified in terms of success percentage. In one embodiment, only prior tasks performed by the individual for the current user for tasks in common with the current task can be determined. In another embodiment, task performance by the individual for all users for tasks in common with the current task can be considered. In one embodiment, only prior tasks performed by the individual for the current user for tasks in common and not in common with the current task can be determined. In another embodiment, task performance by the individual for all users for tasks in common and not in common with the current task can be considered. Referring to user interface 700 depicted in FIG. 7, a user can select weights associated with the various factors F1-F6 using the slide selector of areas 711-716.

In area 720, of user interface 700, there can be depicted a current relationship graph 722 for the user for which a relationship graph is being established. Thus, a user can be given real time feedback as to how the selections defined in areas 711-716 will affect the edge scoring weights applied for the various edges. For example, in area 720, manager system 110 can display in area 724 the edge scoring weights for the various edges of a relationship graph being established, based on the current factor selections. Thus, a user can be given real time feedback as to how a user factor selection defined in areas 711-716 affects the applied edge scoring weights.

In some cases, a user using user interface 700 may wish to increase a sample size of candidate assisting individuals. The number of candidate assisting individuals can be changed simply by changing factor parameters. A common use case for system 100 can be to facilitate assistance with a task for which a professional contractor might be engaged in, e.g. a plumbing task, an automotive repair task, a carpentry task, or an electrician services task. Using areas 711-713 a "professional standing" as set forth herein can be specified as a factor for use in determining an ability of an individual to provide assistance. System 100 improves upon an Internet search method for locating a professional contractor. System 100 can identify candidate individuals for providing assistance based on multiple factors and can identify individuals who are socially connected to certain user for whom a request for assistance is made. Professional contractors who are "people you know" or who "know people you know" can be readily identified and automatically engaged. The professional status factor can be emphasized or deemphasized by weight selections of a user.

User interface 700 can include override functionality e.g. which allows a user to manually input weights in area 724 that override the Eq. 1 determined weights e.g. in the case that a user wishes to force an individual to have a certain e.g. high or low weight for a specified task.

In area 720, there can be depicted tertiary nodes 726 in dashed in form, which specify the contacts of a curtain user's second order contacts. Using area 720, a user can initiate invitations for such individuals depicted by tertiary nodes 726 to become first order contacts of the user specified in primary node representations 723 of area 720. Using Eq. 1, manager system 110 can calculate edge weights for various edges of the relationship graph 500i being established.

With a relationship graph 500i established, manager system 110 can use a relationship graph 500i to determine a best one or more individual to provide assistance to a user. For example, manager system 110 can generate a prioritized list of candidate task assisting individuals. The prioritized list can be a list based on the values of edge weight scores. In an example as depicted in FIG. 6, wherein "ALEX" has an edge weight score of "3", "BARBARA" has an edge weight of "1", and "CINDY" has an edge weight of "2". Manager system 110 can generate a prioritized list of candidate task assisting individuals as follows, "ALEX" first priority, "CINDY" second priority, and "BARBARA" third priority.

For performing a calculation using Eq. 1, manager system 110 can make multiple queries of data repository 112, computer devices 130A-130Z, and/or social media system 140, to obtain information for the requirements of a defined factor. For example, manager system 110 for determining location factor can examine a current GPS system reported location on the computer devices 130A-130Z, for determining past successes of an individual, manager system 110 can examine data of tasks area 2125 from data repository 112. For determining calendar availability of a user, manager system 110 can examine calendar information of computer devices 130A-130Z and/or calendar information indicated in social media system 140.

Based on the information for use in determining scores under the various factors F1-F6 using Eq., 1, manager system 110 can perform establishing of a relationship graph 500i for the user at block 1104. At block 1105, manager system 110 can determine if the currently established relationship graph for the requesting (Nth) user is sufficient for purposes of providing a recommendation as to an individual to provide assistance to the user.

At block 1104, manager system 110 can attempt to determine weights for the various edges based on information currently known to system 100. Thus, as shown by the relationship graph of FIG. 6 in one scenario, manager system 110 may be able to determine that sufficient information is available, for example, that edge 512i has a weight score of 3, edge 514i has a weight score of 1, and edge 516i has a weight score of 2. In one embodiment manager system 110 can have the ability to ascertain the various edge weights of edges 512i, 514i, 516i and accordingly can specify the edge weights as indicated by the edge weights 511i, 513i, and 515i (FIG. 6) in the case that the requesting user has completed rules configuration for a current task.

For example, in some instances sufficient information for populating edge weight scores 511i, 513i, and 515i as depicted in FIG. 6 are available, and in some instances sufficient information is not available for the providing of such edge weight scores in which case edge weights scores of edge weights 511i, 513i, and 515i are missing. In one example, the request sent at block 1302 can be a request manually initiated by a new user who has not yet used user interface 700 to define rules for determining edge weights. In another example, data of system 100 may be insufficient to permit manager system 110 to determine a defined threshold amount of the information specified in Eq. 1.

Based manager system 110 at block 1105 determining that sufficient information is available and that the relationship graph 500*i* established at block 1104 is sufficiently populated, manager system 110 can proceed to block 1107. To perform generating a prioritized list of one or more candidate assisting users as set forth herein based on the edge weights of the established relationship graph established at block 1104. On completion of block 1107 manager system 110 can proceed to block 1108 to provide one or more output based on the relationship graph established at block 1104. The one or more output can be an output to provide assistance to the requesting user. The one or more output can include notifications to the selected task assisting individual specifying parameters of a task and/or another output such as an output to initiate a machine process, as set forth herein.

In one embodiment based on manager system 110 at block 1105 determining that sufficient information is not available and that the relationship graph established at block 1104 is not sufficient to provide a recommendation as to an assisting user, manager system 110 can proceed to block 1106 to perform one or more alternative edge scoring weight populating process for completion of relationship graph establishing initiated at block 1104.

At block 1106 in one embodiment, manager system 110 can perform a process for populating edge scoring weights for completion of the establishing at block 1104 that includes aggregating relationship graphs in a manner explained with reference to FIG. 8.

Figure 8:
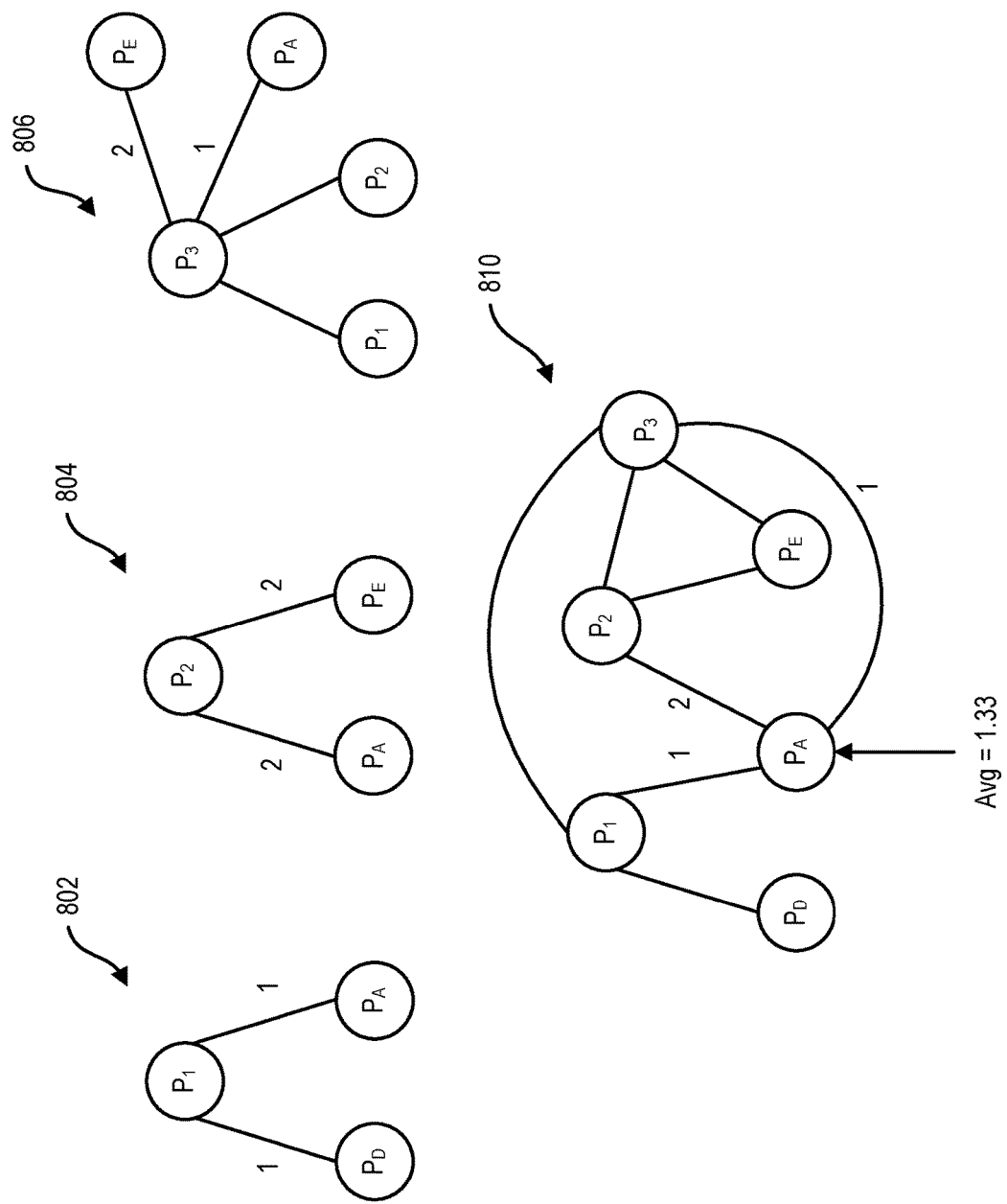
FIG. 8 depicts relationship graphs that can be established by a manager system in one embodiment.

In reference to FIG. 8 manager system 110 can perform aggregating relationship graph for users other than the requesting user. Manager system 110 at block 1106 can perform establishing a relationship graph for the first user, using the processes generally set forth with respect to block 1104. The selected first user can be selected on the basis of the first user having a primary contact in common with the requesting user initiating assistance at block 1302. The first user can be a user other than the requesting user. For establishing a relationship graph for the first user, manager system 110 can provide an instance of template graph 500 as shown in FIG. 5 for the first user. Manager system 110 can examine connections of the first user to determine the secondary nodes of the remaining graph instance. Manager system 110 can determine for the edge weights 511, 513, and 515 of template graph 500 using Eq. 1 based on factors determined by the first user using user interface 700 (FIG. 7).

Also at block 1106 according to the edge weight populating process described with reference to FIG. 8 manager system 110 can perform repeating the obtaining and the establishing for a second to Nth users. Thus, on the completion of block 1106 in accordance with the process described in connection with FIG. 8, manager system 110 can have assembled relationship graphs for first to Nth users, users other than the requesting user. Performance of block 1106 can include multiple queries of data repository 112 as indicated by query/response block 1122, performed by data repository 112. At block 1106, manager system 110 can perform aggregating relationship graphs for the first through Nth users. Providing of an aggregated relationship graph is described with reference to FIG. 8.

Depictions of relationship graphs for different users are provided at 802, 804, and 806, as shown in FIG. 8. Manager system 110 can select the establishing of relationship graphs 802, 804, 806 on the basis of relationship graphs having a secondary node in common with a relationship graph 500*i* for the requesting user. For example, referring to FIG. 6, the requester "REQUESTER" specified in primary node 502*i* can have "ALEX" as a first order connection and "ALEX" can be specified in a secondary node PA. Manager system 110 can select relationship graphs 802, 804, and 806 for aggregation on the basis of relationship graphs 802, 804, and 806 also specifying the individual PA ("ALEX") as a secondary node. Manager system 110 can use an aggregated relationship graph to determine missing information of a relationship graph. For example, the edge weight 511*i* of relationship graph 500*i* may be missing. Manager system 110 can use an aggregated relationship graph 810 of FIG. 8 to determine the missing information.

Manager system 110 can provide an aggregated relationship graph 810. The aggregated relationship graph 810 can be provided by connecting secondary nodes of the relationship graphs 802, 804, and 806. At block 1109, manager system 110 can perform populating of a relationship graph for the requesting user using the aggregated relationship graph 810 depicted in FIG. 8. For example, the relationship graph 500*i* for a certain user under one scenario can have unknown edge weights 511*i*, 513*i*, and 515*i* rather than known edge weights as depicted in FIG. 6. Manager system 110 at block 1109 can populate missing edge weight 511*i* using the aggregated relationship graph 810 depicted in FIG. 8. For example, referring to FIG. 8, the edge weight for individual PA ("ALEX") can be calculated based on the individual's association with the different users P1, P2, and P3. Manager system 110 in one embodiment can calculate a missing edge weight 511*i* by averaging the different edge weights or by using another function. Manager system 110 can repeat the process described for determining missing edge weight 511*i* for the determining of missing edge weight 513*i*, and missing edge weight 515*i*. In the scenario that these edge weights are missing and not known as illustrated in FIG. 8. For determining missing edge weight 513*i* manager system 110 can aggregate relationship graphs 500*i* for users having "BARBARA" (FIG. 6) as a primary contact. For determining missing edge weight 515*i* manager system 110 can aggregate relationship graphs 500*i* for users having "CINDY" as a primary contact. FIG. 8 describes a specific embodiment wherein primary connections of the first user are subject to examining. Alternate rules can be employed, e.g. in which secondary connections of the first user are also examined.

Referring again to Eq. 1, it is seen that manager system 110 can run machine learning processes so that accuracy of results is enhanced based on historical results information e.g. as stored in tasks area 2125 of data repository 112. Manager system 110 can leverage historical results data stored in tasks area 2125 in a variety of ways.

In one aspect as set forth in reference to Eq. 1, past success data, as set forth in reference with factor F6 "success," can be used as a factor to determine an edge weight score indicative of an individual's ability to provide assistance in respect to a specified task.

Figure 4:
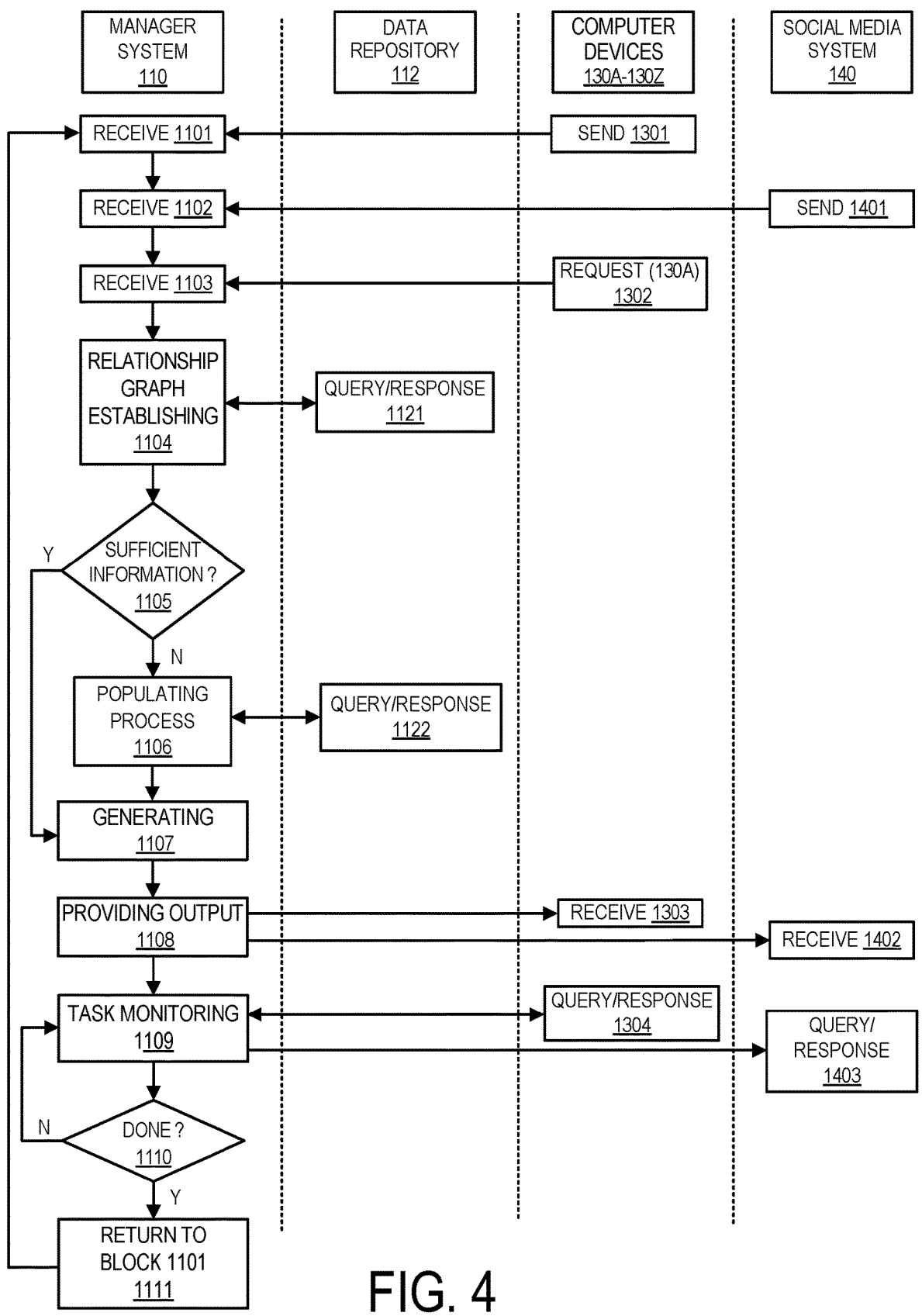
FIG. 4 is a flowchart depicting a method for use in guiding task assistance in one embodiment.

It was described in reference to populating block 1106 of the flowchart of FIG. 4 that missing data can be populated using relationship graphs that have been more fully developed for other users.

Another process for populating edge weight scores at block 1106 is described with reference to Table A herein below. According to the edge weight score populating process described with reference to Table A manager system 110 can use data of tasks area 2125 to search for and identify patterns indicative of associations between different tasks. For example, manager system 110 in one embodiment can search tasks area 2125 to identify tasks having similar success rates among different individuals who have provided assistance in performance of the task where each of several e.g. randomly selected individuals exhibit similar success rates in respect to different tasks. Manager system 110 can determine that a task has been successfully completed by selected individuals selected for providing assistance in respect to a task using task monitoring functions set forth herein. Manager system 110 can determine therefore that the tasks are similar to one another and can associated the tasks. Thus, where manager system 110 is establishing a relationship graph for a certain user and manager system 110 e.g. has not yet received user defined factors e.g. using user interface 700 for determining edge weights for the task, manager system 110 can initially populate missing information of the relationship graph using information of a relationship graph for a task determined to be associated to the current task based on similar success profiles for the different associated tasks. Manager system 110 can associate first and second tasks where success rates for the first and second tasks are similar from the perspective of a group of individuals selected for providing assistance performing the task.

Referring to Table A, Table A provides illustrative success rates for different assistance providing individuals A-H in respect to different tasks, 1-6. Manager system 110 can calculate dissimilarity scores between different assistance providing individuals for different tasks. Using such processing in reference to Table A, manager system 110 can determine that tasks 4 and 5 have relatively low dissimilarity scores based on the success rates for the tasks being similar to one another, across a group of selected assistance providing individuals. Manager system 110 can therefore associate tasks 4 and 5. Accordingly, where manager system 110 is establishing a relationship graph for a certain user in respect to task 4 but only has established relationship graph information for that user for task 5, manager system 110 for that task (i.e. task 4) can populate information of the relationship graph using the task 5 edge weight and secondary contact information. In Table A the specified success rate specified indicates the rate of success for certain task by an assistance providing individual.

TABLE A

| TASK | INDIVIDUAL | | | | | | | |
|---|---|---|---|---|---|---|---|---|
| | A | B | C | D | E | F | G | H |
| 1 | 0.85 | 0.40 | 0.30 | 0.60 | 0.80 | 0.75 | 0.65 | 0.55 |
| 2 | 0.40 | 0.30 | 0.90 | 0.90 | 0.75 | 0.45 | 0.50 | 0.50 |
| 3 | 0.55 | 0.50 | 0.85 | 0.60 | 0.70 | 0.40 | 0.30 | 0.40 |
| 4 | 0.95 | 0.70 | 0.95 | 0.70 | 0.65 | 0.95 | 0.90 | 0.80 |
| 5 | 0.90 | 0.75 | 0.95 | 0.60 | 0.70 | 0.85 | 0.95 | 0.75 |
| 6 | 0.55 | 0.50 | 0.80 | 0.90 | 0.60 | 0.35 | 0.80 | 0.90 |

Another process for populating edge weight scores at block 1106 is described with reference to area 760 of user interface 700 as shown in FIG. 7. According to the process described in connection with area 760 of FIG. 7, manager system 110 can use historical data of tasks area 2125 to recommend or automatically implement factors and/or weights being defined by a user or to auto-establish Eq. 1 factor and/or weights. Referring to FIG. 7 a user can be using user interface 700 to define Eq. 1 factors and weights. In one embodiment, manager system 110 can examine data of tasks area 2125 to recommend user defined factors and/or weights. For recommending a factor and/or weight, manager system 110 can identify past tasks performed on behalf of the current or other users having a task classification matching the current task classification. Manager system 110 can then responsively examine the identified tasks to isolate the successful tasks of the identified tasks. Manager system 110 can then responsively examine relationship graph information of relationship graphs used for selection of assisting individuals performing the successful tasks to identify the user specified Eq. 1 factors and/or weights yielding selecting of an assisting individual successfully performing a task. In one embodiment, manager system 110 can display the identified user specified Eq. 1 factors in area 760 and the user can elect to specify current factor and weight selections in accordance with the recommended factors and/or weight. In one embodiment, manager system 110 can auto-specify current factor and weight selections for the current user in accordance with the identified Eq. 1 factors and/or weights yielding selecting of an assisting individual successfully performing a task.

On populating missing edge weights of relationship graph 500*i* for the requesting user (FIG. 6), manager system 110 can proceed to block 1107 to perform generating a prioritized list of one or more candidate assisting users as set forth herein based on the edge weights of the established relationship graph established at block 1104. On completion of block 1107 manager system 110 can proceed to block 1108 to provide one or more output based on the prioritized list. The one or more output provided at block 1108 can be an output to facilitate assistance by an individual to a requesting user requesting assistance with respect to a defined task. The providing of an output at block 1107 can include providing one or more output to one or more individual based on the prioritized list generated by manager system 110, e.g. providing outputs to the first through Nth prioritized individuals of the generated prioritized list generated at block 1107. In one embodiment, manager system 110 can automatically output a notification to one or more identified individual of the prioritized list generated.

In one embodiment, providing one or more output at block 1108 can include outputting a notification to a selected individual, selected for providing assistance to a user initiating a request sent at block 1302. A notification output can be received by one or more of computer devices 103A-130Z at block 1303. Notifications can be provided e.g. to a computer device of a selected individual and/or to a social media system 140 for receipt by social media system 140 at block 1402. Notifications can be provided to the user requesting assistance and/or the individual selected for providing assistance. Notifications can specify parameters of a task, e.g. task descriptions and task deadlines. In one embodiment, providing one or more output at block 1108 can include outputting one or more communication to initiate an automated process, e.g. can initiate the transport of a selected task assisting individual to the location of a task in a self-driving vehicle. In one embodiment, providing one or more output at block 1108 can include outputting one or more communication to initiate an automated process, e.g. can initiate activation of one or more sensor to perform task monitoring at block 1109. The one or more sensor can include e.g. a GPS sensor and/or a camera sensor of a computer device of computer devices 130A-130Z of a selected assisting individual. The providing of one or more output at block 1108 can include activating task monitoring process 118 (FIG. 1).

At block 1109, manager system 110 can perform task monitoring of tasks being facilitated by manager system 110. It will be understood that task monitoring at block 1109 for a current task for which an output is provided at block 1108 can be iterative and performed on a continue until done basis (block 1110) and can be completed in one embodiment subsequent to a time lag after performance of providing at block 1109. Task monitoring at block 1109 can include multiple queries of computer devices 130A-130Z as depicted by query response block 1304 performed by computer devices 130A-130Z and multiple queries in social media system 140 as depicted by query response block 1403.

Task monitoring can include performing monitoring of the success of a guided task. In one embodiment, task monitoring at block 1108 can be automatic or semi-automatic.

For example, task monitoring in one embodiment at block 1109 can include manager system 110 examining location information output from GPS sensors of computer devices of computer devices 130A-130Z belonging to a requesting user and a task assisting individual and a requesting user to determine that a task has been completed successfully and within a specified time. For example, manager system 110 can determine that a task has been completed successfully based on an individual dwelling at a specified location of a task at a specified time for performance of the task and exits the location prior to a specified deadline for the task. For example, manager system 110 can determine that a task has been completed unsuccessfully where an individual does not dwell at a specified location of a task at the specified time for performance of the task and/or exits the location of the task after the specified deadline for the task.

Task monitoring in one embodiment at block 1109, can include manager system 110 controlling camera and/or audio sensors of a computer device of computer devices 130A-130Z belonging to a selected tasking assisting individual and can perform spatial pattern recognition to determine whether a task has been completed successfully. Data repository 112 can store a spatial pattern indicative of a task being performed and manager system 110 can determine that a task has been successfully performed based on the spatial pattern being detected. Manager system 110 can determine that a task has not been successfully performed based on the spatial pattern not being detected.

Task monitoring in one embodiment at block 1109, can include manager system 110 controlling accelerometer of the computer device of computer devices 130A-130Z belonging to a selected task assisting individual and can perform pattern recognition to determine that task has been completed successfully. The computer device of the task assisting individual can be provided by a smartwatch. Data repository 112 can store a motion pattern indicative of a task being performed properly and manager system 110 can determine that a task has been successfully performed based on the motion pattern being detected. Manager system 110 can determine that a task has not been successfully performed based on the motion pattern not being detected.

Task monitoring in one embodiment at block 1109 can include activating NLP process 113 to examine posts entered on social media system 140 regarding a task. For example, task monitoring at block 1109 can include examining a post by a user and/or an individual selected for providing assistance to the user to classify as a post as relating to a task using topic classification and then using sentiment analysis e.g. positive sentiment to determine that a task has been completed successfully. For example, topic analysis on a post can be performed to determine that a task relates to the specified task (e.g. a gardening task, an automotive repair task, a plumbing task, an electrician services task, and a carpentry task, a tax preparing task a software training task, a vehicle transportation task, or a driving lesson task, or another task) and sentiment analysis indicating "joy" can indicate that the task was performed successfully. Manager system 110 on detecting via activation of NLP process 113 a post matching a topic classification of a task and detecting a "joy" sentiment can determine that the task was performed successfully. Manager system 110 on failing to detect via activation of NLP process 113 a post matching a topic classification of a task and/or failing to detect a "joy" sentiment in a post can determine that the task was performed successfully. On the performance of task monitoring at block 1109, manager system 110 can update tasks area 2125 of data repository 112 and can indicate information of the success or failure of a performed task. At block 1111, manager system 110 can return to receive block 1101.

Referring to FIG. 7 manager system 110 can process textual data input into area 704 for determining a task classification for entered task information describing a task. Manager system 110 can activate NLP process 113 for processing textual information input into area 704. Manager system 110 can be configured so that classification of task specifying information input into area 704 can become more specific as a corpus of data of data repository 112 grows. For example, manager system 110 using NLP topic classification can classify the text descriptions into area of "rose trimming" and "planting tomatoes" generally into the generic classification "gardening" where the record count of the entries into data repository 112 classified under the generic classifier "gardening" is below a threshold. Where the record count is above a threshold manager system 110 can classify the entries more specifically, e.g. into the classifications "ornamental gardening" and "vegetable gardening" respectively. Thus, manager system 110 can be configured so that the guidance provided by manager system 110 can become more specific as the corpus of data repository 112 grows.

In reference to block 1302 it was described that a user may manually initiate a request for assistance e.g. using a displayed user interface such as user interface 700 as set forth in FIG. 7. In another embodiment, manager system 110 can automatically initiate a task assistance request on behalf of one or more user e.g. on behalf of one user or a plurality of respective users of computer devices 130A-130Z. In one embodiment, one or more additional system 150 can be a newsfeed system and manager system 110 can initiate a task assistance request on behalf of one or more user based on a processing of newsfeed data received from additional system 150 provided by a newsfeed system. In one embodiment, manager system 110 can be configured to process newsfeed data of additional system 150 provided by a newsfeed system. For such processing manager system 110 can activate NLP process 113. Manager system 110 can examine newsfeed data for events wherein the topic of "volunteer requests" is identified together with other topic classifiers, e.g. "snow removal" or "flood evacuation" in the case there is newsfeed data report requesting volunteers for snow removal or flood evacuation relief. Manager system 110 can responsively automatically generate a task assistance request on behalf of one user or a plurality of users based on the processing.

In the highlighted example manager system 110 as an alternative to block 1302 can automatically generate a task assistance request to all subscribing users of system 100 based a processing of newsfeed data indicating that there is a public call for volunteers in respect to a determined topic, e.g. snow removal or flood evacuation. Manager system 110 can be configured to perform a plurality of instances of the processing blocks 1104-1110 simultaneously, each instance to determine one or more task assisting individual for each requesting user also has auto requested task assistance based on newsfeed data processing by manager system 110. Manager system 110 for each user can establish a relationship graph 500i for the user. For establishing the relationship graph 500i manager system 110 can determine initially if the user has completed an edge weight factor configuration using user interface 700 (FIG. 7) to define Eq. 1 factors. If not in one embodiment, manager system 110 can auto populate edge weights for relationship graphs for each requesting user using an alternate process set forth herein such as the process involving relationship graph aggregating as set forth in connection with FIG. 8, the task association method described in respect to Table 1, or the factor recommendation process described with reference to area 760 as set forth in FIG. 7.

Manager system 110 can apply alternate processes to automatically initiate a request for assistance in place of the manually initiated request described with reference to block 1302. In one embodiment, manager system 110 automatically initiating an assistance request on behalf of a certain user can be responsive. Manager system 110 iteratively examining a certain user's calendar, e.g. which can be included in social media system 140. Manager system 110 can subject textual data of a certain user's calendar to NLP processing via activating of NLP process 113 in order to identify a task to be performed by the certain user e.g. for a vehicle transportation service to pick up a student from a student event (e.g. the child of a certain user). Manager system 110 can also examine location of the certain user (e.g. by examining of a GPS output of the certain user's computer device) and the time of the pickup event to determine that the certain user will not be able to complete the task listed in the calendar (e.g. can determine the certain user is located at a distance too far away to complete the pickup). Based on the determining the certain user is not in sufficient range to complete the pickup, and based on the determined topic of the calendar entry manager system 110 at block 1302 can automatically initiate a task assistance request on behalf of the certain user to generate a prioritized list of individuals to assist with the vehicle transportation services task indicated on the certain user's calendar.

There is set for the herein in one embodiment a method that allows identification of a task assisting individual that will maximize success rate based on the factors that the system picks and custom factors that you define for the task. In one embodiment, common factors can be shared between users for common tasks. Embodiments herein can use historical task data and the weighted trust score accuracy can improves over time as more data is accumulated from the feedback loop. One particular application of a method set forth herein is determining who is the best individual or individuals to alert in a particular scenario, for example, an emergency.

Embodiments herein relate to identification of individuals in social media for task performance based on past usage and traits. One embodiment includes identifying individuals of a social media platform for ability of performing a task. Readiness scores can be predicted based on past performance of tasks and/or other factors. A predicted readiness score includes a value corresponding to whether an individual is predicted to be ready for performing the task. Individuals that are ready to perform the task are determined based on comparing the readiness scores with a threshold. Willingness scores for performing a task by individuals determined to be able and ready to perform the task can be determined.

Embodiments herein can define a weighted custom relationship graph specifying individuals having associated edge weight scores that indicate an ability to complete a certain task. The edge score can be regarded as a trust score, i.e. an indication of the extent to which an individual is trusted to perform a task. Embodiment herein recognize that a user may trust certain individuals to perform a certain task more than others. For example, a user may trust individual A to assist with preparing taxes whereas the user may trust individual B to assist with gardening. Both of individual A and B can be specified in a relationship graph and the edges that connects the user individual A and B can have edge weights indicating trust scores. As these individuals perform their tasks over time, the relationship graphs can change and become more accurate.

Certain embodiments herein feature the ability to define custom factors fit for a specific scenario. Certain embodiments herein feature the ability to transfer common factors among common scenarios. Certain embodiments herein feature the ability to adjust factors based on successes or failures. Certain embodiments herein feature the ability to transfer existing factors to new users. Certain embodiments herein feature the ability for system to generate default factors and weights for similar users Certain embodiments herein may offer various technical computing advantages, involving computing advantages to address problems arising in the realm of computer networks. A fundamental aspect of a computer system's functionality is its ability to interact with users. If users are given irrelevant or inaccurate information, users are likely to disengage from a computer system. If one the other hand a computer system provides accurate and relevant information the attention of a user can be retained as wells as continued interactions between computer system users. Embodiments herein can improve networked communications between users in one aspect with use of features that use artificial intelligence to provide recommendations and notifications to users based on the recommendations. The recommendations and notices in an illustrative embodiment can relate to recommendation on help assistance to provide help assistance in respect to a specified task. With accurate information provided a likelihood of respective users of networked computer systems remaining engaged an in communication with another through the performance of a task and over the course of the performance of several tasks increases. Embodiments herein can employ data structuring processes, e.g. employing relationship graphs for structuring data to transform unstructured data optimized for human processing into a form optimized for computerized processing. Embodiments herein can facilitate performance of tasks and automated initiation of a process to monitor performance of a task using sensor outputs. Embodiments herein can include automated processes to examine for conditions triggering task assistance requests and can include processes to initiate a task assistance request based on a condition being satisfied. Embodiments herein can provide results and advantages that are not possible or practical without use of components of a technical computing environment, such as providing for decision making beyond the limits of human ability to recall events and items related to events and beyond the human user's capacity to recognize patterns and recognize significance of events. Embodiments herein can for example feature crowdsourced rules so that determinations provided by a computer system accurately account for varying perspectives of a plurality of user. Embodiments herein can provide results and advantages that are not possible or practical without use of components of a technical computing environment, such as providing for decision making using fact items that human user cannot practically of possibly access. Embodiments herein can include artificial intelligence processing platforms featuring improved processes to transform unstructured data into structured form permitting computer based analytics and predictive decision making. In one embodiment, a template graph can be provided which keys both collection of structured data and the providing of one or more output. Embodiments herein also can include machine learning platforms that leverage historical data for improved predictive analytics.

Figure 9:
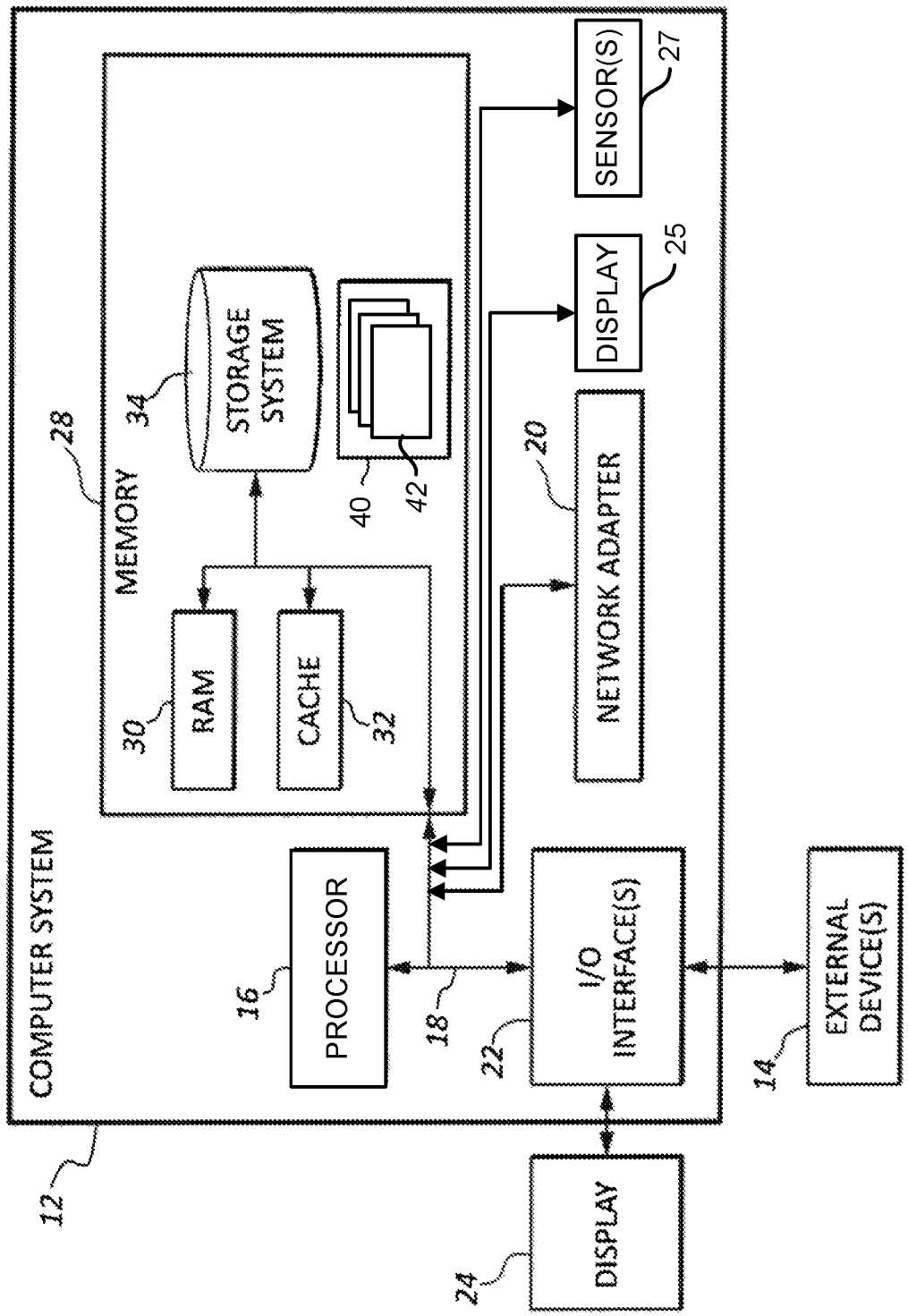
FIG. 9 depicts a computing node according to one embodiment.
Figure 10:
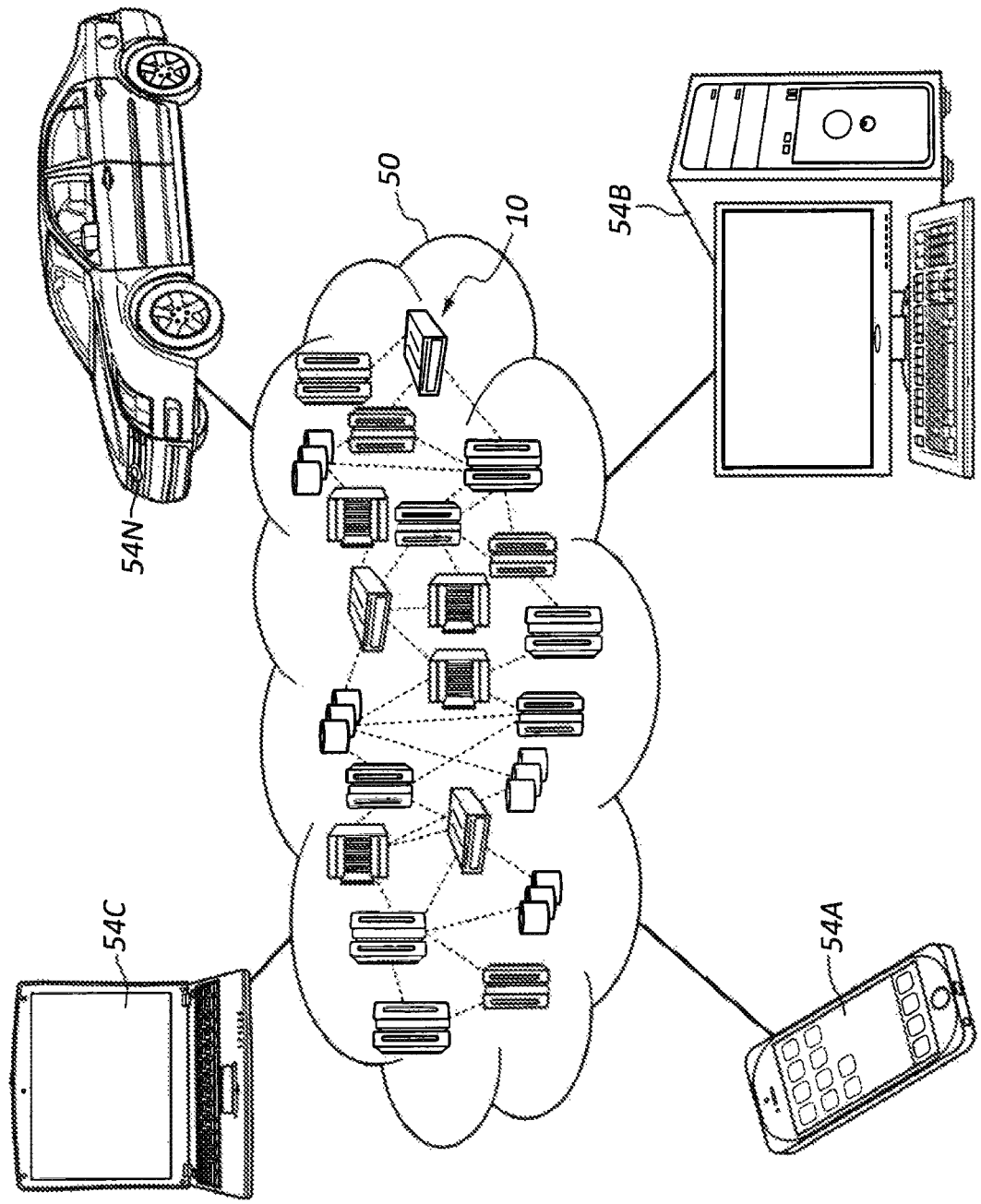
FIG. 10 depicts a cloud computing environment according to one embodiment.
Figure 11:
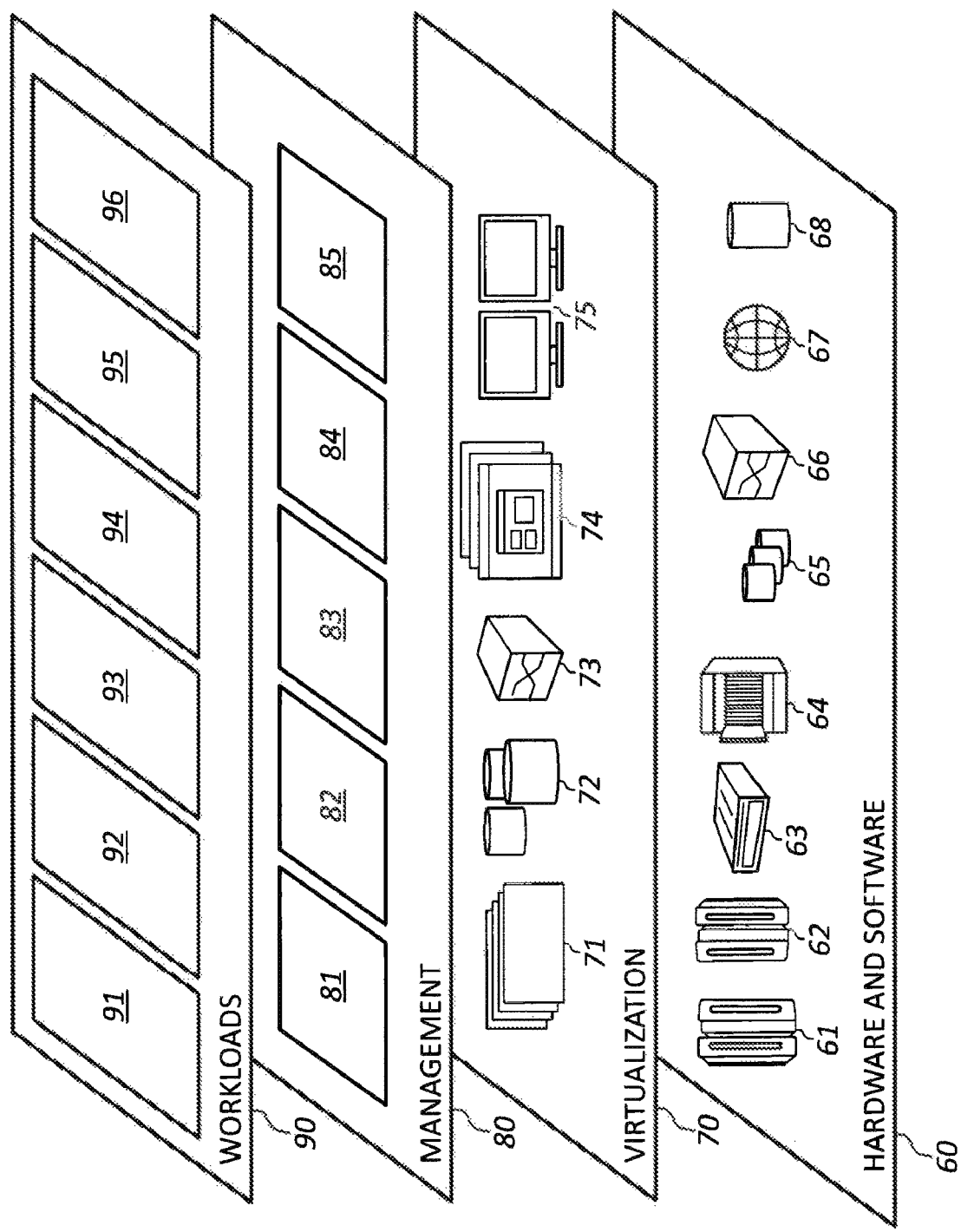
FIG. 11 depicts abstraction model layers according to one embodiment.

FIGS. 9-11 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 9, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 9, computer system 12 in computing node 10 is shown in the form of a general-purpose computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 10-11.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to method 200 of FIG. 2, for performing functions described with reference to method 300 of FIG. 3, and the functions described with reference to manager system 110 as set forth in the flowchart of FIG. 4. In one embodiment, social media system 140 can include one or more computing node 10 and can include one or more program 40 for performing functions described with reference to social media system 140 as set forth in the flowchart of FIG. 4. In one embodiment, one or more user computer device 130A-130Z can include one or more computing node 10 and can include one or more program 40 for performing functions described with reference to one or more user computer device 130A-130Z as set forth in the flowchart of FIG. 4.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 10 computing node 10 is described as being implemented in a cloud computing environment and accordingly is referred to as a cloud computing node in the context of FIG. 10.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for facilitating performance of a task as set forth herein. The processing components 96 can be implemented with use of one or more program 40 described in FIG. 9.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:

initiating a request to provide assistance to a certain user, wherein the method includes in response to the initiating subjecting text based data to natural language processing to extract a topic classifier that specifies a certain task topic for a certain task to be performed for the certain user;

in response to the initiating, examining social media data to identify socially connected individuals who are socially connected to the certain user;

establishing, based on identified socially connected individuals who are socially connected to the certain as identified by the examining, a relationship graph for the certain user, the relationship graph having a primary node that specifies the certain user and a plurality of lower order nodes specifying individuals of the identified socially connected individuals of the certain user as identified by the examining, wherein the primary node and at least one lower order node of the plurality of lower order nodes is connected to at least one other node by an edge so that there are defined a plurality of edges, wherein one or more lower order node of the plurality of lower order nodes specifies an individual socially connected to the certain user;

wherein the establishing includes populating for edges of the plurality of edges an edge weight score indicating an ability of an individual specified in a lower order node to provide assistance to the certain user in respect to the certain task, wherein the populating includes using historical task data of at least one connected individual of the identified socially connected individuals stored in a data repository, the historical task data specifying an attribute of performance by the at least one connected individual with respect to an historical task having the topic classifier that specifies the certain task topic;

generating a prioritized list of individuals to provide assistance to the certain user in respect to the certain task based on the populated edge weight scores for the edges of the relationship graph having the primary node that specifies the certain user, which edges indicate an ability of an individual specified in a lower order node to provide assistance to the certain user in respect to the certain task; and providing one or more output based on the prioritized list, wherein the method includes monitoring performance, using one or more sensor, of the certain task by a selected individual selected from the prioritized list of individuals to provide assistance to the certain user, wherein the method includes, in response to the monitoring, storing result data in the data repository specifying a result of the selected individual performing the certain task, wherein the method includes updating the relationship graph using the result data to provide an updated relationship graph, and generating, using the updated relationship graph, a second prioritized list of individuals to provide assistance to the certain user in respect to a subsequent task.

2. The method of claim 1, wherein the method includes providing a user interface that allows the user to define factors for use in performing the populating for edges of the plurality of edges an edge weight score.

3. The method of claim 1, wherein the one or more output is a communication to initiate a machine process, the machine process including examining data provided by one or more sensor to monitor performance of the certain task.

4. The method of claim 1, wherein the populating includes examining historical task information respecting one or more previously performed task, wherein the populating for edges of the plurality of edges an edge weight score includes applying a set of weighted factors, wherein one of the factors is a success factor, and wherein the examining historical task information respecting one or more previously performed task includes for determination of the success factor examining past success data for an individual in the performance of a prior task in common with the certain task.

5. The method of claim 1, wherein the populating includes examining historical task information respecting one or more previously performed task, wherein the populating for edges of the plurality of edges an edge weight score includes applying a set of weighted factors, wherein the set of weighted factors includes a relationship factor that specifies a relationship of the certain user and individual socially connected to the certain user, an equipment factor based on equipment in possession by the individual socially connected to the certain user, an education factor level of the individual socially connected to the certain user, a location factor based on a location of the individual socially connected to the certain user, a calendar factor that specifies calendar availability of the individual socially connected to the certain user, and a success factor based on success information of the individual socially connected to the certain user in the performance of one or more prior tasks.

6. The method of claim 1, wherein the populating includes examining historical task information respecting one or more previously performed task, wherein the populating for edges of the plurality of edges an edge weight score includes identifying a task associated to the certain task, and wherein the examining historical task information respecting one or more previously performed task includes for performing the identifying examining success profiles for a set of individuals in respect to a plurality of prior performed tasks to determine a task having a success profile matching a success profile for the certain task.

7. The method of claim 1, wherein the populating includes examining historical task information respecting one or more previously performed task, wherein the populating for edges of the plurality of edges an edge weight score includes applying a set of one or more factor, and wherein the examining historical task information respecting one or more previously performed task includes for performing the applying identifying a successfully performed one or more task in common with the certain task and performing the applying based on at least one factor resulting in selection of one or more task assisting individual in the successfully performed one or more task.

8. The method of claim 1, wherein the populating includes establishing a relationship graph for each of first through Nth users, the first through Nth users being other than the certain user, wherein the relationship graph for each of the first through Nth users includes a primary node that connects to a set of secondary nodes by a set of edges, the primary node specifying a user of the first through Nth user and the set of secondary nodes specifying a set of individuals socially connected to the user specified by the primary node, the set of edges indicating an ability of respective individuals of the set of individuals to provide assistance to the user specified by the primary node in respect to the certain task, aggregating relationship graphs for each of the first through Nth users to provide an aggregated relationship graph; and processing edge weights of the aggregated relationship graph for determining an edge weight of the edge weight scores.

9. The method of claim 1, wherein the method includes activating a natural language processing (NLP) process for examining newsfeed data and based on examining automatically performing the establishing, the generating and the providing.

10. The method of claim 1, wherein the method includes evaluating calendar information of the certain user using natural language processing (NLP) processing to determine a topic of a task of the calendar of the certain user, and based on a determining using the calendar information that the certain user is not within range to perform the task of the user, automatically initiating a task assistance request on behalf of the certain user, wherein establishing the generating, and the outputting are performed in based on the automatically initiating of the task assistance request.

11. The method of claim 1, wherein the method includes activating a natural language processing (NLP) process for examining newsfeed data and based on examining automatically performing the establishing, the generating and the providing, wherein the populating includes examining historical task information respecting one or more previously performed task, where in the populating for edges of the plurality of edges an edge weight score includes applying a set of one or more factor, and wherein the one or more output is a communication to initiate a machine process, the machine process including examining data provided by one or more sensor to monitor performance of the certain task.

12. The method of claim 1, wherein the method includes activating a natural language processing (NLP) process for examining newsfeed data and based on examining automatically performing the establishing, the generating and the providing, wherein the populating includes examining historical task information respecting one or more previously performed task, wherein the populating for edges of the plurality of edges an edge weight score includes applying a set of one or more factor, and wherein the examining historical task information respecting one or more previously performed task includes for performing the applying identifying a successfully performed one or more task in common with the certain task and performing the applying based on at least one factor resulting in selection of one or more task assisting individual in the successfully performed one or more task, and wherein the one or more output is a communication to initiate a machine process, the machine process including examining data provided by one or more sensor to monitor performance of the certain task.

13. The method of claim 1, wherein the certain task is arbitrarily defined by text based data input into a computing node by the certain user for initiating the request, wherein the populating for edges of the plurality of edges an edge weight score indicating an ability of an individual specified in a lower order node to provide assistance to the certain user in respect to the certain task is performed in dependence on the text based data input into a computing node by the certain user for whom the request to provide assistance is initiated.

14. The method of claim 1, wherein the initiating the request to provide assistance to the certain user is performed in response to subjecting text based data received from a newsfeed system to the natural language processing to extract the topic classifier that specifies the certain task topic for a certain task to be performed for a certain user, wherein the populating for edges of the plurality of edges an edge weight score indicating an ability of an individual specified in a lower order node to provide assistance to the certain user in respect to the certain task is performed in dependence on the text based data received from the newsfeed system.

15. The method of claim 1, wherein the method includes identifying within the data repository a pre-stored relationship graph for another user that specifies within a node of the pre-stored relationship graph a particular individual in common with a certain individual specified within a node of the relationship graph subject to the establishing, wherein the populating for edges of the plurality of edges an edge weight score indicating an ability of an individual specified in a lower order node to provide assistance to the certain user in respect to the certain task includes using data of the pre-stored relationship graph stored in the data repository.

16. The method of claim 1, wherein the method includes monitoring performance, using one or more sensor, of the certain task by a selected individual selected from the prioritized list of individuals to provide assistance to the certain user, wherein the method includes, in response to the monitoring, storing result data in the data repository specifying a result of the selected individual performing the certain task, wherein the method includes updating the relationship graph using the result data to provide an updated relationship graph, and generating, using the updated relationship graph, a second prioritized list of individuals to provide assistance to the certain user in respect to a subsequent task, wherein the certain task is arbitrarily defined by text based data input into a computing node by the certain user for initiating the request, wherein the populating for edges of the plurality of edges an edge weight score indicating an ability of an individual specified in a lower order node to provide assistance to the certain user in respect to the certain task is performed in dependence on the text based data input into a computing node by the certain user for whom the request to provide assistance is initiated, wherein the method includes identifying within the data repository a pre-stored relationship graph for another user that specifies within a node of the pre-stored relationship graph a particular individual in common with a certain individual specified within a node of the relationship graph subject to the establishing, wherein the populating for edges of the plurality of edges an edge weight score indicating an ability of an individual specified in a lower order node to provide assistance to the certain user in respect to the certain task includes using data of the pre-stored relationship graph stored in the data repository.

17. The method of claim 1, wherein the populating includes assigning the edge weight score for the individual in dependence on an examining data repository stored historical result data specifying a result of an historical instance in which the individual performed an historical task commonly classified with the certain task.

18. The method of claim 1, wherein the method includes presenting in a user interface area to the certain user the established relationship graph for the certain user, the presented relationship graph presenting edge values indicating an ability of node associated individuals to provide assistance to the certain user with respect to the certain task, the node associated individuals including first order contacts of the certain user, and second order contact of the user, and wherein the user interface area is configured so that the certain user can initiate, using the user interface area, invitations to the second order contacts to be first order contacts of the certain user.

19. A system comprising:
a memory;
at least one processor in communication with the memory; and
program instructions executable by one or more processor via the memory to perform a method comprising:
initiating a request to provide assistance to a certain user, wherein the method includes in response to the initiating subjecting text based data to natural language processing to extract a topic classifier that specifies a certain task topic for a certain task to be performed for the certain user;
in response to the initiating, examining social media data to identify socially connected individuals who are socially connected to the certain user;
establishing, based on identified socially connected individuals who are socially connected to the certain as identified by the examining, a relationship graph for the certain user, the relationship graph having a primary node that specifies the certain user and a plurality of lower order nodes specifying individuals of the identified socially connected individuals of the certain user as identified by the examining, wherein the primary node and at least one lower order node of the plurality of lower order nodes is connected to at least one other node by an edge so that there are defined a plurality of edges, wherein one or more lower order node of the plurality of lower order nodes specifies an individual socially connected to the certain user;
wherein the establishing includes populating for edges of the plurality of edges an edge weight score indicating an ability of an individual specified in a lower order node to provide assistance to the certain user in respect to the certain task, wherein the populating includes using historical task data of at least one connected individual of the identified socially connected individuals stored in a data repository, the historical task data specifying an attribute of performance by the at least one connected individual with respect to an historical task having the topic classifier that specifies the certain task topic;

generating a prioritized list of individuals to provide assistance to the certain user in respect to the certain task based on the populated edge weight scores for the edges of the relationship graph having the primary node that specifies the certain user, which edges indicate an ability of an individual specified in a lower order node to provide assistance to the certain user in respect to the certain task; and providing one or more output based on the prioritized list, wherein the method includes monitoring performance, using one or more sensor, of the certain task by a selected individual selected from the prioritized list of individuals to provide assistance to the certain user, wherein the method includes, in response to the monitoring, storing result data in the data repository specifying a result of the selected individual performing the certain task, wherein the method includes updating the relationship graph using the result data to provide an updated relationship graph, and generating, using the updated relationship graph, a second prioritized list of individuals to provide assistance to the certain user in respect to a subsequent task.

20. A computer program product comprising:

a computer readable storage medium readable by one or more processing circuit and storing instructions for execution by one or more processor for performing a method comprising:

initiating a request to provide assistance to a certain user, wherein the method includes in response to the initiating subjecting text based data to natural language processing to extract a topic classifier that specifies a certain task topic for a certain task to be performed for the certain user;

in response to the initiating, examining social media data to identify socially connected individuals who are socially connected to the certain user;

establishing, based on identified socially connected individuals who are socially connected to the certain as identified by the examining, a relationship graph for the certain user, the relationship graph having a primary node that specifies the certain user and a plurality of lower order nodes specifying individuals of the identified socially connected individuals of the certain user as identified by the examining, wherein the primary node and at least one lower order node of the plurality of lower order nodes is connected to at least one other node by an edge so that there are defined a plurality of edges, wherein one or more lower order node of the plurality of lower order nodes specifies an individual socially connected to the certain user;

wherein the establishing includes populating for edges of the plurality of edges an edge weight score indicating an ability of an individual specified in a lower order node to provide assistance to the certain user in respect to the certain task, wherein the populating includes using historical task data of at least one connected individual of the identified socially connected individuals stored in a data repository, the historical task data specifying an attribute of performance by the at least one connected individual with respect to an historical task having the topic classifier that specifies the certain task topic;

generating a prioritized list of individuals to provide assistance to the certain user in respect to the certain task based on the populated edge weight scores for the edges of the relationship graph having the primary node that specifies the certain user, which edges indicate an ability of an individual specified in a lower order node to provide assistance to the certain user in respect to the certain task; and providing one or more output based on the prioritized list, wherein the method includes monitoring performance, using one or more sensor, of the certain task by a selected individual selected from the prioritized list of individuals to provide assistance to the certain user, wherein the method includes, in response to the monitoring, storing result data in the data repository specifying a result of the selected individual performing the certain task, wherein the method includes updating the relationship graph using the result data to provide an updated relationship graph, and generating, using the updated relationship graph, a second prioritized list of individuals to provide assistance to the certain user in respect to a subsequent task.

* * * * *